US012701511B2

(12) United States Patent
Elshafie et al.

(10) Patent No.: US 12,701,511 B2
(45) Date of Patent: Aug. 4, 2026

(54) GROUPCAST CONFIGURATION DEACTIVATION

(71) Applicant: QUALCOMM Incorporated, San Diego, CA (US)

(72) Inventors: Ahmed Elshafie, San Diego, CA (US); Marwen Zorgui, San Diego, CA (US); Diana Maamari, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 536 days.

(21) Appl. No.: 18/313,061

(22) Filed: May 5, 2023

(65) Prior Publication Data

US 2024/0373360 A1     Nov. 7, 2024

(51) Int. Cl.
H04W 52/02     (2009.01)

(52) U.S. Cl.
CPC ... H04W 52/0235 (2013.01); H04W 52/0219 (2013.01)

(58) Field of Classification Search
CPC .................... H04W 52/0235; H04W 52/0219
See application file for complete search history.

(56) References Cited

U.S. PATENT DOCUMENTS

| | | | | |
|---|---|---|---|---|
| 2013/0097236 A1* | 4/2013 | Khorashadi | ........... | G06F 16/951 |
| | | | | 709/204 |
| 2018/0167883 A1* | 6/2018 | Guo | .................. | H04W 52/0216 |

| | | | | |
|---|---|---|---|---|
| 2020/0068495 A1* | 2/2020 | Yang | ................ | H04W 72/0473 |
| 2020/0092685 A1* | 3/2020 | Fehrenbach | .......... | H04W 72/23 |
| 2020/0322939 A1* | 10/2020 | Cao | ........................ | H04W 72/02 |
| 2020/0383061 A1* | 12/2020 | Yang | ..................... | H04W 52/50 |
| 2021/0022091 A1* | 1/2021 | Li | ........................ | H04W 52/242 |
| 2021/0084516 A1* | 3/2021 | Rungta | ................ | H04W 24/10 |
| 2021/0105787 A1* | 4/2021 | Park | ..................... | H04W 72/542 |
| 2021/0105788 A1* | 4/2021 | Kim | ....................... | H04W 76/10 |
| 2021/0168708 A1* | 6/2021 | Tang | ..................... | H04W 48/20 |
| 2021/0227604 A1* | 7/2021 | Huang | ................ | H04W 40/248 |
| 2021/0234595 A1* | 7/2021 | Zhang | ............... | H04W 72/0453 |
| 2021/0359745 A1* | 11/2021 | Farag | .................... | H04L 1/0071 |
| 2021/0377912 A1* | 12/2021 | El Hamss | ............ | H04L 1/1861 |
| 2022/0007392 A1* | 1/2022 | Chang | ............... | H04W 72/1268 |
| 2022/0007403 A1* | 1/2022 | Li | ......................... | H04W 72/20 |
| 2022/0030493 A1* | 1/2022 | Hong | ................... | H04L 1/1896 |
| 2022/0039009 A1* | 2/2022 | Iyer | ...................... | H04L 5/0098 |
| 2022/0086869 A1* | 3/2022 | Fong | ................... | H04W 72/1263 |
| 2022/0104101 A1* | 3/2022 | Elshafie | ................ | H04W 40/22 |

(Continued)

FOREIGN PATENT DOCUMENTS

| | | | | | | |
|---|---|---|---|---|---|---|
| CN | 119789225 A | * | 4/2025 | ........ | H04W 72/1273 |
| EP | 4391642 A1 | * | 6/2024 | ........... | H04L 1/1692 |

(Continued)

*Primary Examiner* — Sujoy K Kundu
*Assistant Examiner* — Vladislav Y Agureyev
(74) *Attorney, Agent, or Firm* — Dinsmore & Shohl LLP

(57)     ABSTRACT

Various aspects of the present disclosure generally relate to wireless communication. In some aspects, a user equipment (UE) may receive, from a network entity, information in a groupcast message indicating a set of configurations to be deactivated. The UE may deactivate the set of configurations in accordance with the information. Numerous other aspects are described.

26 Claims, 12 Drawing Sheets

(56) References Cited

U.S. PATENT DOCUMENTS

| | | | | |
|---|---|---|---|---|
| 2022/0182859 A1* | 6/2022 | Da Silva | H04W 52/0219 |
| 2022/0225248 A1* | 7/2022 | Landis | H04W 24/10 |
| 2022/0225434 A1* | 7/2022 | Kim | H04W 76/30 |
| 2022/0295407 A1* | 9/2022 | Hosseini | H04W 76/27 |
| 2023/0020973 A1* | 1/2023 | Fujishiro | H04W 28/26 |
| 2023/0023919 A1* | 1/2023 | Qi | H04W 4/06 |
| 2023/0066448 A1* | 3/2023 | Tseng | H04W 72/20 |
| 2023/0076409 A1* | 3/2023 | Elkotby | H02J 50/001 |
| 2023/0077471 A1* | 3/2023 | Kim | H04L 5/001 370/330 |
| 2023/0092094 A1* | 3/2023 | Ryu | H04B 7/0617 375/267 |
| 2023/0097142 A1* | 3/2023 | Alfarhan | H04B 17/318 370/329 |
| 2023/0180263 A1* | 6/2023 | Liu | H04W 72/0453 370/329 |
| 2023/0180269 A1* | 6/2023 | Li | H04W 72/11 370/312 |
| 2023/0198595 A1* | 6/2023 | Zhang | H04L 5/0057 370/254 |
| 2023/0224813 A1* | 7/2023 | Mohammad Soleymani | H04W 52/0216 370/311 |
| 2023/0269614 A1* | 8/2023 | Chen | H04W 24/08 370/252 |
| 2023/0309016 A1* | 9/2023 | Li | H04W 76/14 |
| 2023/0362796 A1* | 11/2023 | Tran | H04W 48/12 |
| 2024/0008058 A1* | 1/2024 | Chang | H04W 48/14 |
| 2024/0056825 A1* | 2/2024 | Zhang | H04B 7/0628 |
| 2024/0114374 A1* | 4/2024 | Chege | H04W 24/10 |
| 2024/0172246 A1* | 5/2024 | Mohammad Soleymani | H04L 5/0053 |
| 2024/0244423 A1* | 7/2024 | Liu | H04W 88/06 |
| 2024/0244521 A1* | 7/2024 | Yi | H04W 52/0235 |
| 2024/0276305 A1* | 8/2024 | Khoshkholgh Dashtaki | H04L 1/1664 |
| 2024/0334538 A1* | 10/2024 | Zhou | H04W 52/0216 |
| 2024/0357700 A1* | 10/2024 | Hu | H04W 52/0229 |
| 2024/0397388 A1* | 11/2024 | Ohara | H04L 5/0098 |
| 2025/0039755 A1* | 1/2025 | Zhang | H04W 36/008355 |
| 2025/0081101 A1* | 3/2025 | Soldati | H04W 36/0066 |
| 2025/0142589 A1* | 5/2025 | El Hamss | H04W 52/0219 |
| 2025/0150365 A1* | 5/2025 | Li | H04W 24/10 |
| 2025/0275012 A1* | 8/2025 | Wang | H04L 5/0007 |
| 2025/0279808 A1* | 9/2025 | Sun | H04B 7/063 |

FOREIGN PATENT DOCUMENTS

| | | | | | | |
|---|---|---|---|---|---|---|
| EP | 4443945 A1 | * | 10/2024 | | H04L 5/0098 |
| JP | 2024516842 A | * | 4/2024 | | H04W 28/0205 |
| KR | 20230104156 A | * | 7/2023 | | H04W 52/0216 |
| KR | 20240112694 A | * | 7/2024 | | H04W 92/20 |
| KR | 20240141837 A | * | 9/2024 | | H04W 24/10 |
| WO | WO-2020156155 A1 | * | 8/2020 | | H04W 72/23 |
| WO | WO-2021013005 A1 | * | 1/2021 | | H04W 72/20 |
| WO | WO-2021178941 A1 | * | 9/2021 | | H04W 52/04 |
| WO | WO-2021222919 A1 | * | 11/2021 | | H04W 4/70 |
| WO | WO-2021231835 A1 | * | 11/2021 | | H04W 72/11 |
| WO | WO-2022082488 A1 | * | 4/2022 | | H04W 76/28 |
| WO | WO-2022119715 A1 | * | 6/2022 | | H04W 48/14 |
| WO | WO-2023006427 A1 | * | 2/2023 | | H04W 52/0216 |
| WO | WO-2023016318 A1 | * | 2/2023 | | H04W 36/0069 |
| WO | WO-2023136507 A1 | * | 7/2023 | | H04W 68/02 |

* cited by examiner

900

910 — Receive, from a network entity, information in a groupcast message, the information indicating a set of configurations to be deactivated 920 — Deactivate the set of configurations in accordance with the information

Figure 11:
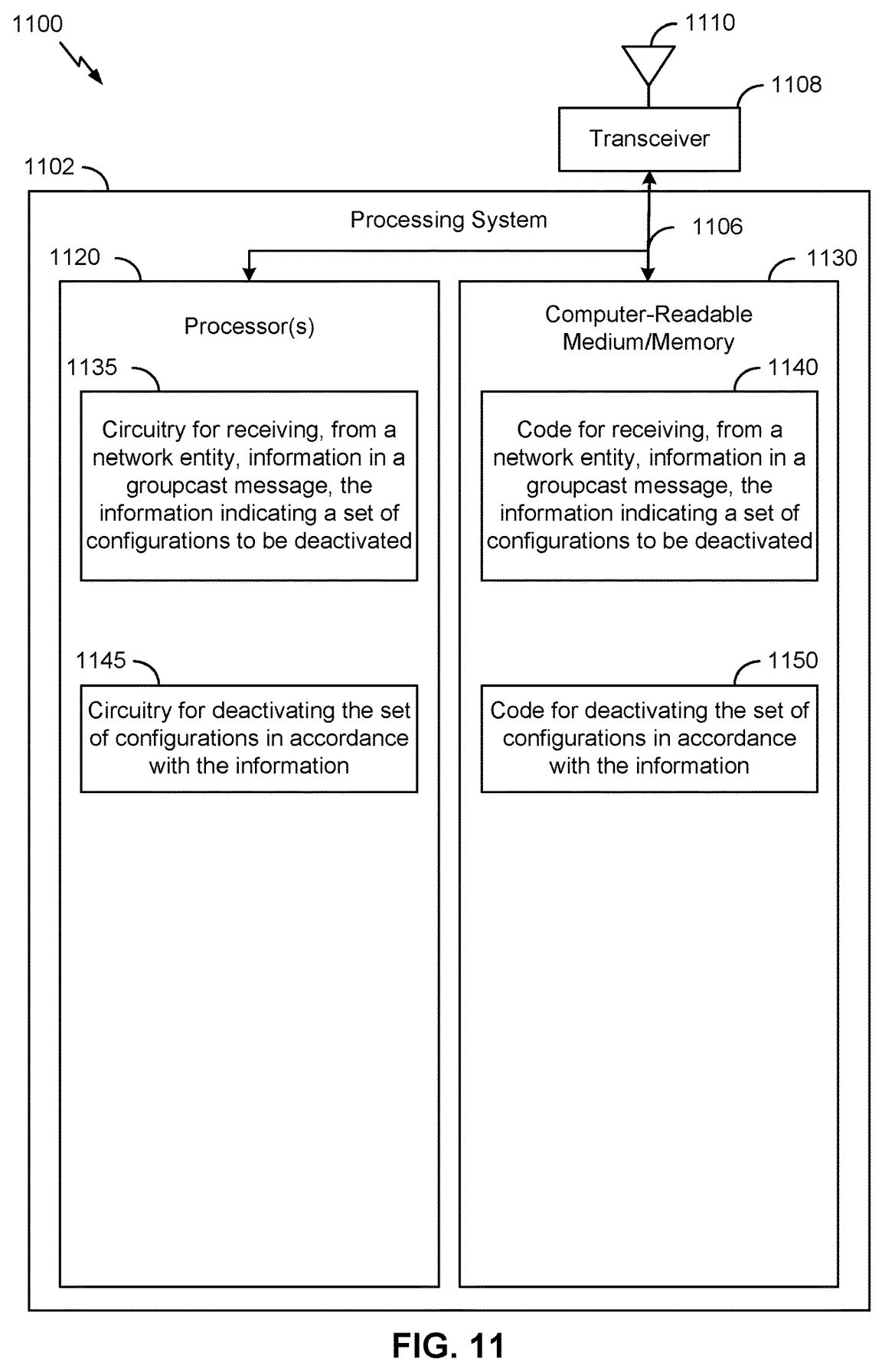

1100

1110

1108

Transceiver

1102

Processing System

1106

1120

1130

Processor(s)

Computer-Readable
Medium/Memory

1135

1140

Circuitry for receiving, from a
network entity, information in a
groupcast message, the
information indicating a set of
configurations to be deactivated Code for receiving, from a
network entity, information in a
groupcast message, the
information indicating a set of
configurations to be deactivated

1145

1150

Circuitry for deactivating the set
of configurations in accordance
with the information Code for deactivating the set of
configurations in accordance
with the information

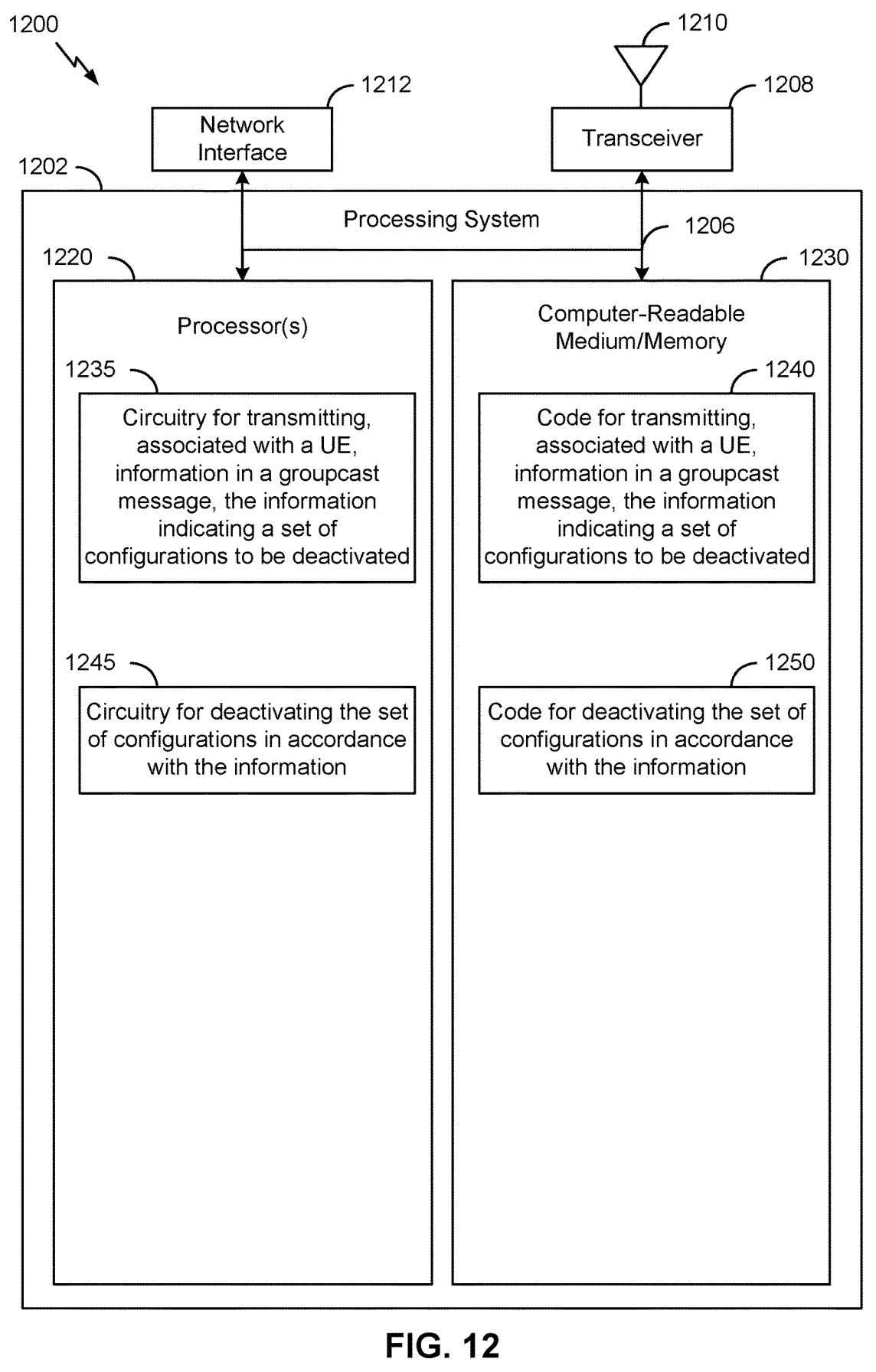

Network Interface

1208

Transceiver

1202

Processing System

1206

1220

1230

Processor(s)

Computer-Readable Medium/Memory

1235

Circuitry for transmitting, associated with a UE, information in a groupcast message, the information indicating a set of configurations to be deactivated

1240

Code for transmitting, associated with a UE, information in a groupcast message, the information indicating a set of configurations to be deactivated

1245

Circuitry for deactivating the set of configurations in accordance with the information

1250

Code for deactivating the set of configurations in accordance with the information

FIG. 12

GROUPCAST CONFIGURATION DEACTIVATION

FIELD OF THE DISCLOSURE

Aspects of the present disclosure generally relate to wireless communication and to techniques and apparatuses for groupcast configuration deactivation.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

Some aspects described herein relate to a method of wireless communication performed by a user equipment (UE). The method may include receiving, from a network entity, information in a groupcast message, the information indicating a set of configurations to be deactivated. The method may include deactivating the set of configurations in accordance with the information.

Some aspects described herein relate to a method of wireless communication performed by a network entity. The method may include transmitting, associated with a UE, information in a groupcast message, the information indicating a set of configurations to be deactivated. The method may include deactivating the set of configurations in accordance with the information.

Other aspects provide: an apparatus operable, configured, or otherwise adapted to perform any one or more of the aforementioned methods and/or those described herein with reference to and as illustrated by the drawings; a non-transitory, computer-readable medium comprising computer-executable instructions that, when executed by a processor of an apparatus, cause the apparatus to perform the aforementioned methods and/or those described herein with reference to and as illustrated by the drawings; a computer program product embodied on a computer-readable storage medium comprising code for performing the aforementioned methods and/or those described herein with reference to and as illustrated by the drawings; and/or an apparatus comprising means for performing the aforementioned methods and/or those described herein with reference to and as illustrated by the drawings. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example of an implementation of code and circuitry for a communications device, in accordance with the present disclosure.

FIG. 12 is a diagram illustrating an example of an implementation of code and circuitry for a communications device, in accordance with the present disclosure.

DETAILED DESCRIPTION

Figure 1:
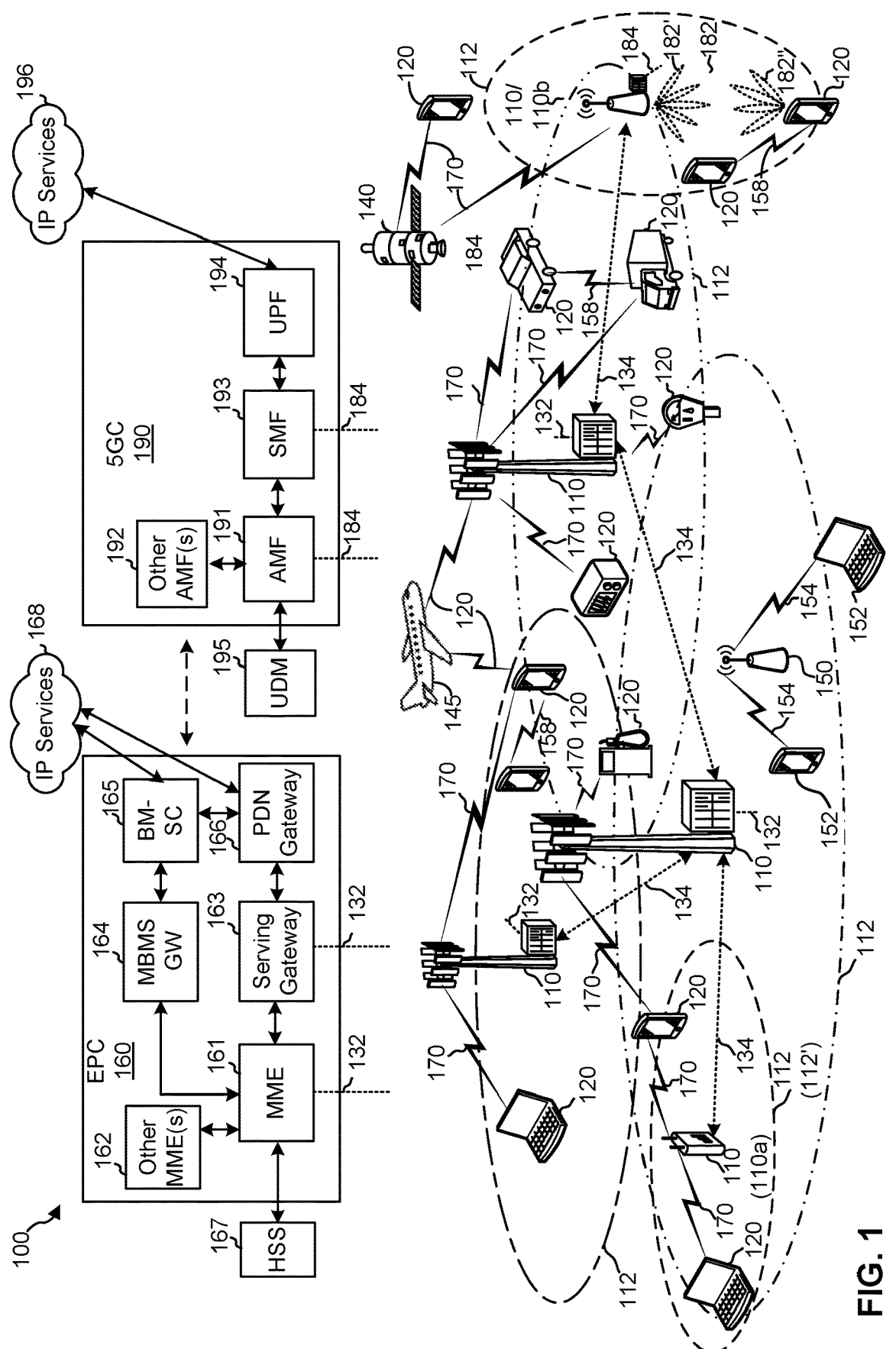
FIG. 1 depicts an example of a wireless communications network, in accordance with the present disclosure.

Aspects of the present disclosure provide apparatuses, methods, processing systems, and computer-readable mediums for groupcast configuration deactivation.

A user equipment (UE) may operate according to various configurations. These configurations may define behaviors relating to, for example, uplink transmissions of the UE, downlink receptions of the UE, measurements by the UE, sidelink communications of the UE, or other behaviors. For example, some configurations may define how a UE communicates with a network entity such as a base station. As another example, some configurations may define how a UE communicates with another UE, such as on a sidelink.

A network entity may implement various techniques to reduce power consumption, such as in connection with a "green network" initiative. For example, a network entity may implement cell discontinuous transmission (DTX), in which transmissions of the network entity are deactivated (e.g., suspended) during certain periods of time. As another example, a network entity may implement cell discontinuous reception (DRX), in which receptions of the network entity are deactivated (e.g., suspended) during certain periods of time. These techniques may reduce power consumption relating to transmission, reception (e.g., monitoring, decoding), and processing at the network entity.

As mentioned, during some periods of time, a network entity may suspend transmission, reception, or other activities (e.g., in connection with cell DRX or cell DTX). However, if transmissions and receptions by UEs continue during these periods of time, the benefit of the cell DTX or DRX may be limited, or the cell DTX or DRX may be interrupted. Thus, a UE may suspend a certain configuration (e.g., relating to transmission or reception that might impact a cell DTX or cell DRX operation) during a period of time. However, individual (e.g., unicast) signaling to indicate configurations that should be activated or deactivated may introduce overhead, particularly when a given network entity is associated with a large number of UEs. Furthermore, in some examples, an indiscriminate deactivation (e.g., suspension) of a set of configurations may lead to negative impact to network operations, such as if an important configuration (random access, as just one example) is suspended in connection with a group of configurations and cannot be utilized to perform a communication in certain situations. For example, if random access is suspended during cell DTX or DRX, a UE may be unable to perform initial access, beam failure recovery, or other operations during periods of network inactivity.

Various aspects relate generally to groupcast signaling relating to configuration deactivation. Some aspects more specifically relate to indication of a set of configurations to be deactivated via groupcast signaling. In some examples, a network entity may transmit, and a UE may receive, information in a groupcast message. The information may indicate a set of configurations to be deactivated (e.g., suspended). The set of configurations may be activated at the UE prior to the UE receiving the information. The UE may deactivate the set of configurations in accordance with the information. By providing the information via groupcast signaling, overhead is reduced, particularly when the information is provided to a large number of UEs. In some examples, one or more configurations may be excluded from the set of configurations. For example, the network entity or the UE may signal information indicating the one or more configurations to be excluded from the set of configurations. Thus, certain operations can be preserved even during cell DTX or DRX, which may facilitate operations such as mission-critical operations or random access.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a UE, a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110a may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
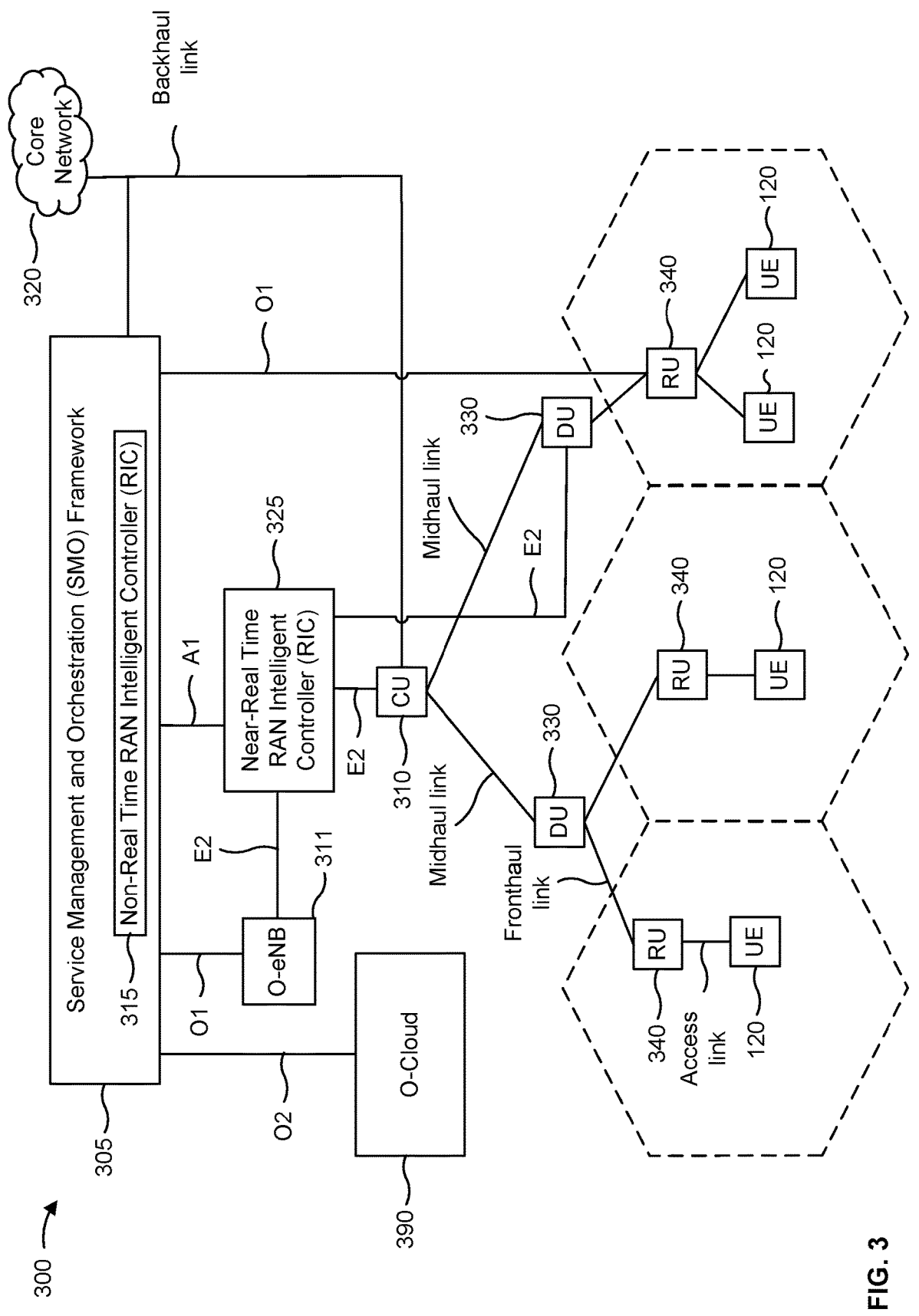
FIG. 3 depicts an example disaggregated base station architecture.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated radio access network architecture, such as an Open RAN (O-RAN) architecture or a Virtualized RAN (VRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an SI interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110b) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHZ, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110b in FIG. 1) may utilize beamforming with a UE 120 to improve path loss and range, as shown at 182. For example, BS 110b and the UE 120 may each include a plurality of antennas, such as antenna elements, antenna panels, and/or antenna arrays to facilitate the beamforming. In some cases, BS 110b may transmit a beamformed signal to UE 120 in one or more transmit directions 182'. UE 120 may receive the beamformed signal from the BS 110b in one or more receive directions 182". UE 120 may also transmit a beamformed signal to the BS 110b in one or more transmit directions 182". BS 110b may also receive the beamformed signal from UE 120 in one or more receive directions 182'. BS 110b and UE 120 may then perform beam training to determine the best receive and transmit directions for each of BS 110b and UE 120. Notably, the transmit and receive directions for BS 110b may or may not be the same. Similarly, the transmit and receive directions for UE 120 may or may not be the same.

Wireless communications network 100 further includes a Wi-Fi access point 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QOS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
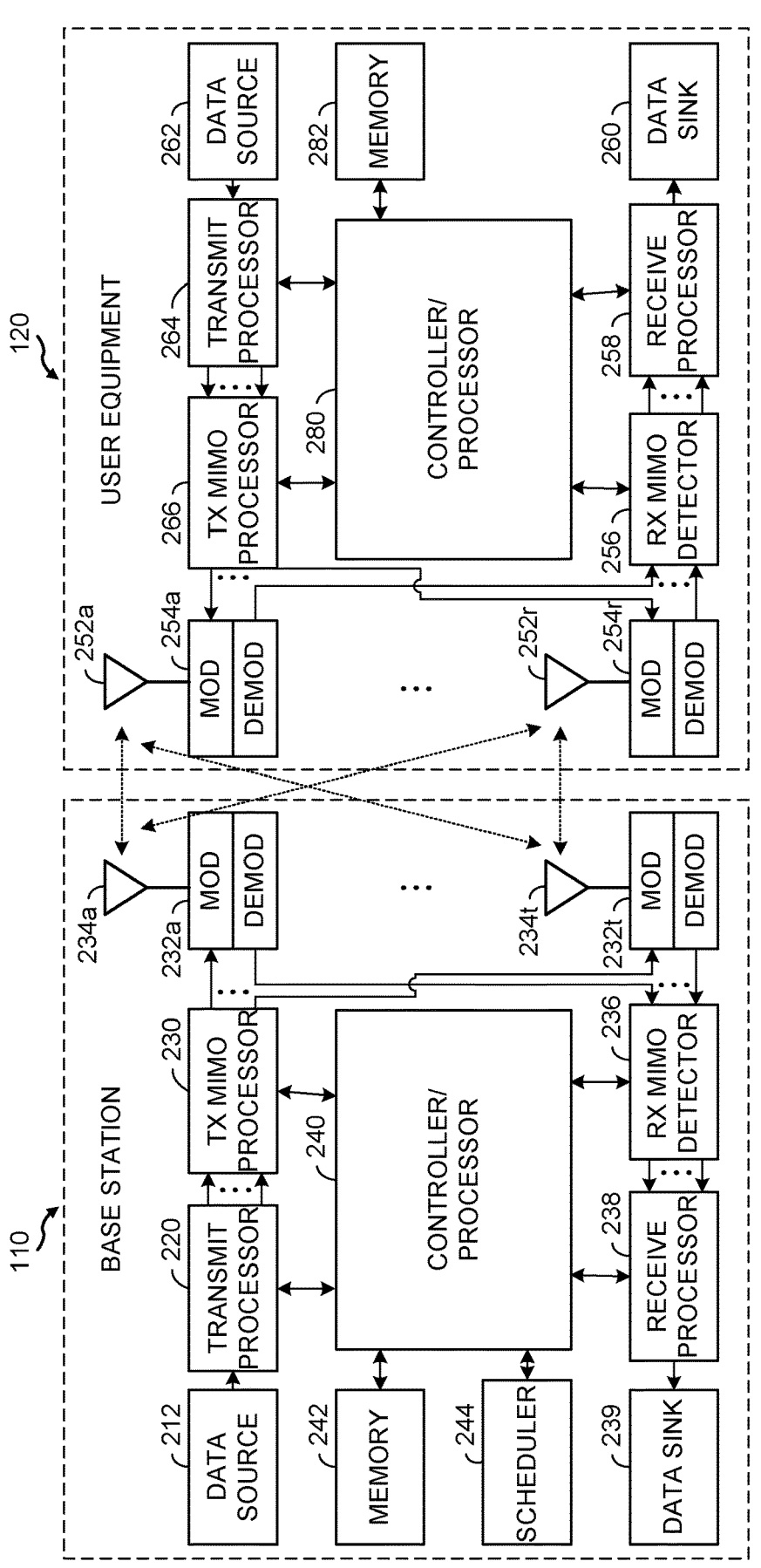
FIG. 2 depicts aspects of an example BS and UE, in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252a-r (collectively 252), transceivers 254a-r (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

UE 120 includes antennas 252a-252r that may receive the downlink signals from the BS 110 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 110.

At BS 110, the uplink signals from UE 120 may be received by antennas 234a-234t, processed by the demodulators in transceivers 232a-232t, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, RX MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, or one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figures 4A, 4B, 4C, 4D:
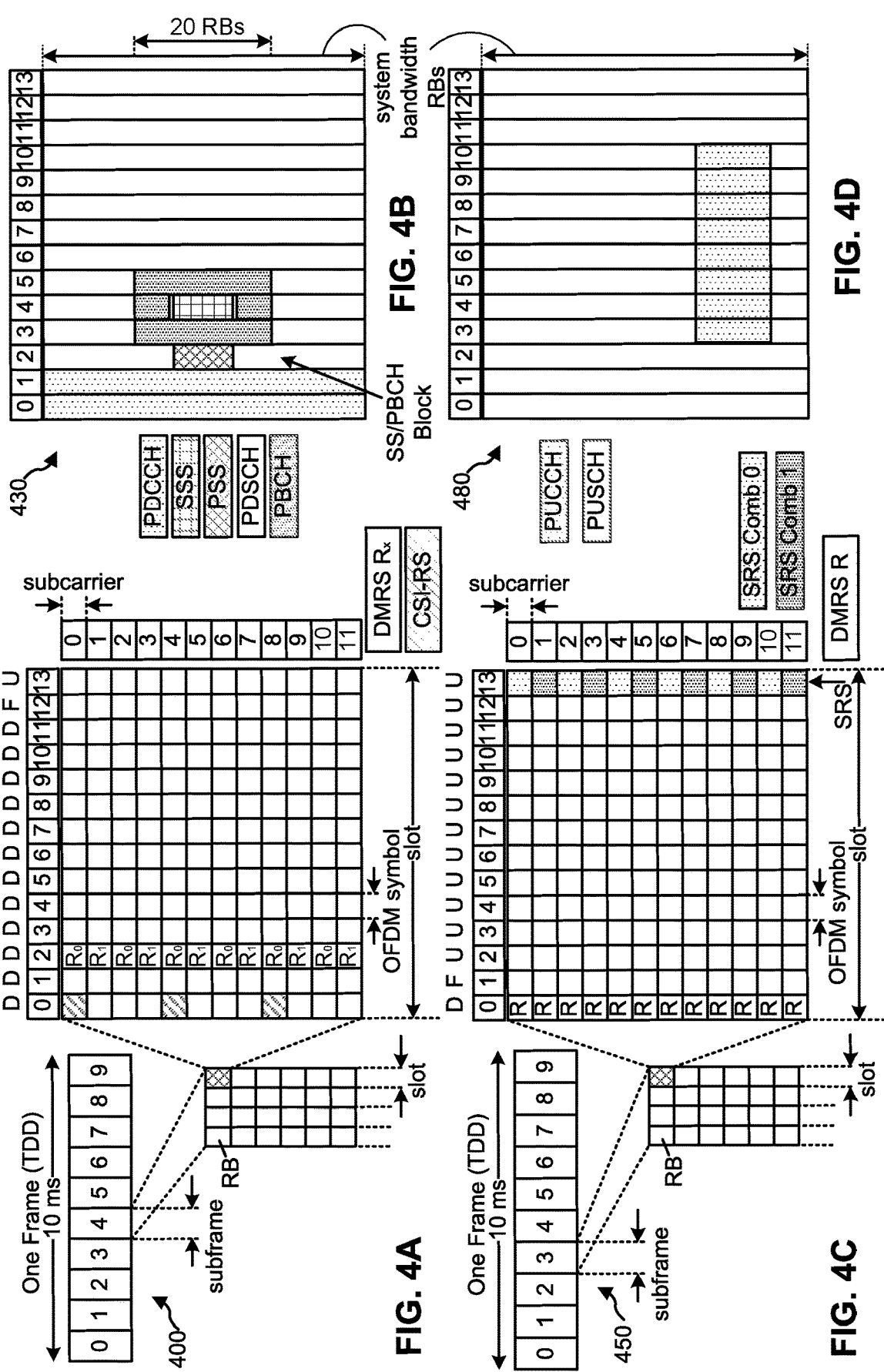
FIGS. 4A, 4B, 4C, and 4D depict aspects of data structures for a wireless communications network in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2^\mu$ slots/subframe. The subcarrier spacing and symbol length/duration are a function of the numerology. The subcarrier spacing may be equal to $2^\mu \times 15$ kHz, where μ is the numerology index, which may be selected from values 0 to 5. Accordingly, the numerology μ=0 has a subcarrier spacing of 15 kHz and the numerology μ=5 has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include demodulation RSs (DMRSs) and/or channel state information reference signals (CSI-RSs) for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., UE 120) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit sounding reference signals (SRSs). The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
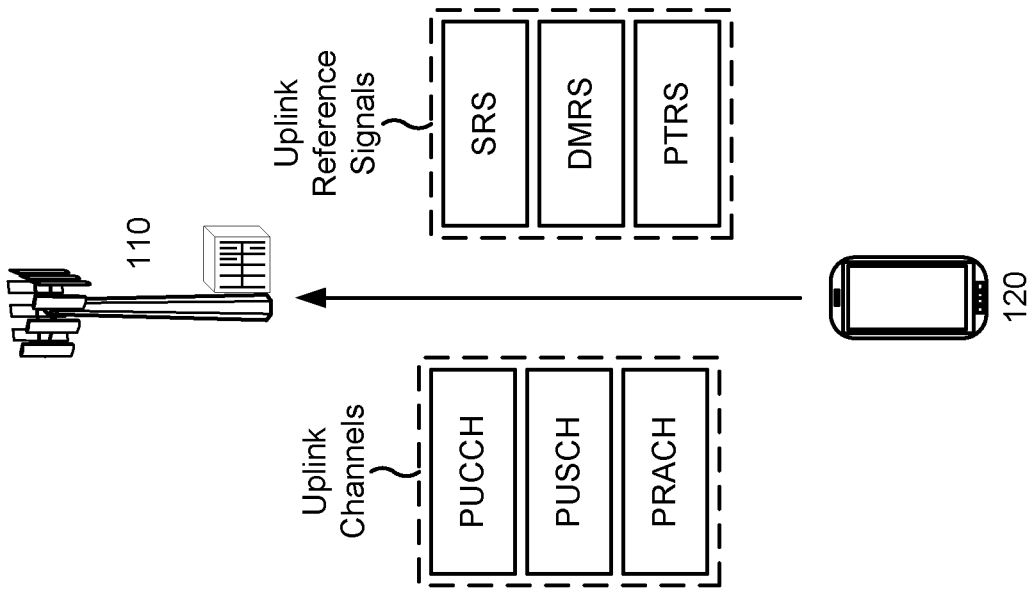
FIG. 5 is a diagram illustrating an example of physical channels and reference signals in a wireless network, in accordance with the present disclosure.
Figure 5:
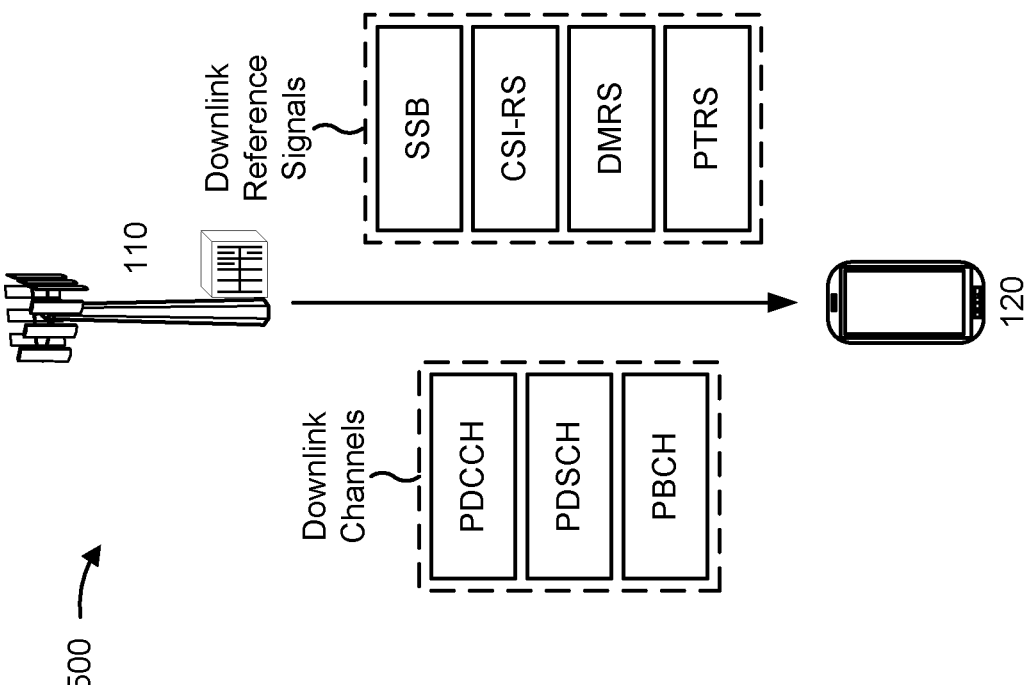

FIG. 5 is a diagram illustrating an example 500 of physical channels and reference signals in a wireless network, in accordance with the present disclosure. As shown in FIG. 5, downlink channels and downlink reference signals may carry information from a BS 110 to a UE 120, and uplink channels and uplink reference signals may carry information from a UE 120 to a BS 110.

As shown, a downlink channel may include a PDCCH that carries DCI, a PDSCH that carries downlink data, or a physical broadcast channel (PBCH) that carries system information, among other examples. In some aspects, PDSCH communications may be scheduled by PDCCH communications. As further shown, an uplink channel may include a PUCCH that carries UCI, a PUSCH that carries uplink data, or a physical random access channel (PRACH) used for initial network access, among other examples. In some aspects, the UE 120 may transmit ACK/NACK feedback or ACK/NACK information in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the BS 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The BS 110 may configure a set of CSI-RSs for the UE 120, and the UE 120 may measure the configured set of CSI-RSs. Based at least in part on the measurements, the UE 120 may perform channel estimation and may report channel estimation parameters to the BS 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The BS 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the BS 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the BS 110 may then calculate a position of the UE 120 based on the RSTD measurements reported by the UE 120.

An SRS may carry information used for uplink channel estimation, which may be used for scheduling, link adaptation, precoder selection, or beam management, among other examples. The BS 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The BS 110 may measure the SRSs, may perform channel estimation based at least in part on the measurements, and may use the SRS measurements to configure communications with the UE 120.

The UE may transmit or receive the above-described signals or channels according to one or more configurations. A configuration may indicate one or more parameters used to transmit or receive a communication, one or more parameters that define operation of the UE, or a combination thereof. In some aspects, a configuration may correspond to a feature, such that when the configuration is enabled, the corresponding feature is enabled. For example, a UE with an enabled beam management configuration may perform beam management, and a UE with a disabled beam management configuration may not perform beam management. In some aspects, a configuration may define a resource or a resource set for a transmission or reception. For example, a configuration may define a specific CSI-RS resource or a specific CSI-RS resource set. If a configuration defining a resource or resource set is enabled, then the UE 120 may transmit or receive a communication according to the resource or resource set. If a configuration defining a resource or resource set is disabled, then the UE 120 may skip (e.g., refrain from) transmitting or receiving a communication according to the resource or resource set.

In some aspects, a configuration may indicate whether PDCCH processing is enabled at the UE. In some aspects, a configuration may indicate one or more DCI formats for which PDCCH processing is enabled (such that the UE may determine blind decoding hypotheses according to the one or more DCI formats). In some aspects, a configuration may indicate whether dynamic grant PDSCH scheduling and reception is enabled. In some aspects, a configuration may indicate whether a type of dynamic grant PDSCH, such as unicast dynamic grant PDSCH or groupcast dynamic grant PDSCH, is enabled. In some aspects, a configuration may indicate whether dynamic grant PUSCH scheduling and transmission is enabled. In some aspects, a configuration may indicate whether configured grant PDSCH configuration or reception (such as via a semi-persistent scheduling (SPS) configuration) is enabled. In some aspects, a configuration may indicate whether configured grant PUSCH configuration or transmission is enabled.

In some aspects, a configuration may indicate whether HARQ-ACK feedback is enabled. In some aspects, a configuration may indicate whether HARQ-ACK feedback is enabled for a particular type of cast (e.g., groupcast or unicast) or grant (e.g., configured grant or dynamic grant). In some aspects, a configuration may indicate whether the UE is to support a subset of PUCCH formats or all PUCCH formats. For example, the configuration may indicate whether the UE is to support functionality corresponding to the subset of PUCCH formats or to all PUCCH formats.

In some aspects, a configuration may indicate whether use of a low-power wakeup radio (LP-WUR) is enabled for the UE. In some aspects, a configuration may indicate whether one or more signals associated with a low power wakeup signal (LP-WUS) are enabled, such as a synchronization signal, a preamble, or the LP-WUS itself. In some aspects, a configuration may indicate whether PRACH transmission is enabled. In some aspects, a configuration may indicate whether reception or measurement of one or more downlink reference signals (e.g., an SSB, a tracking reference signal (TRS), a PTRS, a CSI-RS) is enabled. For example, a configuration may indicate whether one or more CSI-RS types (e.g., periodic, semi-persistent, aperiodic) are supported, whether a measurement type of a CSI-RS (e.g., beam management or channel tracking) is supported, or a combination thereof.

In some aspects, a configuration may indicate whether transmission of one or more uplink reference signals (e.g., SRS transmission, a particular SRS resource, a particular SRS resource set) is enabled. In some aspects, a configuration may indicate whether CSI reporting (e.g., transmission of CSI reports) is enabled. In some aspects, a configuration may indicate whether beam management is enabled. In some aspects, a configuration (e.g., a SIB1 transmission configuration) may indicate whether transmission or reception of system information such as system information block 1 (SIB1) is enabled. In some aspects, a configuration may indicate whether reception of one or more other system information blocks (OSIBs) (e.g., SIB2, SIB3, and so on) is enabled. In some aspects, a configuration may indicate whether energy transfer, to the UE from a network entity, is enabled. In some aspects, a configuration may indicate whether scheduling of energy transfer, to the UE from a network entity, is enabled.

In some aspects, a configuration may indicate whether the UE supports ambient IoT communications (e.g., tag processing, communication with or powering of energy harvesting devices). In some aspects, a configuration may indicate whether transmission of a scheduling request (SR), to the network entity and relating to a radio access link (e.g., a Uu link), is enabled.

In some aspects, a configuration may indicate whether transmission of a buffer status report (BSR), a delay status report (DSR), a statistical delay report (SDR), or a combination thereof is enabled (e.g., for a radio access link). In some aspects, a configuration may indicate one or more parameters for a BSR, a DSR, or an SDR, such as whether a DSR should indicate a remaining packet delay budget (PDB) and/or a timer value (e.g., Twait). Twait may indicate an UL PDCP queueing delay, such as the delay from packet arrival at PDCP upper SAP until the UL grant to transmit the packet is available, which may include a delay associated with receiving a grant for resources (from sending SR/RACH to receiving the first grant). In some aspects, the one or more parameters for the BSR, the DSR, or the SDR may indicate whether an SDR should indicate an average value of Twait or a remaining PDB, a mean value of Twait or a remaining PDB, a variance of Twait or a remaining PDB, or a cumulative distribution function of Twait or the remaining PDB.

As indicated above, FIG. 5 is provided as an example. Other examples may differ from what is described with regard to FIG. 5.

Figure 6:
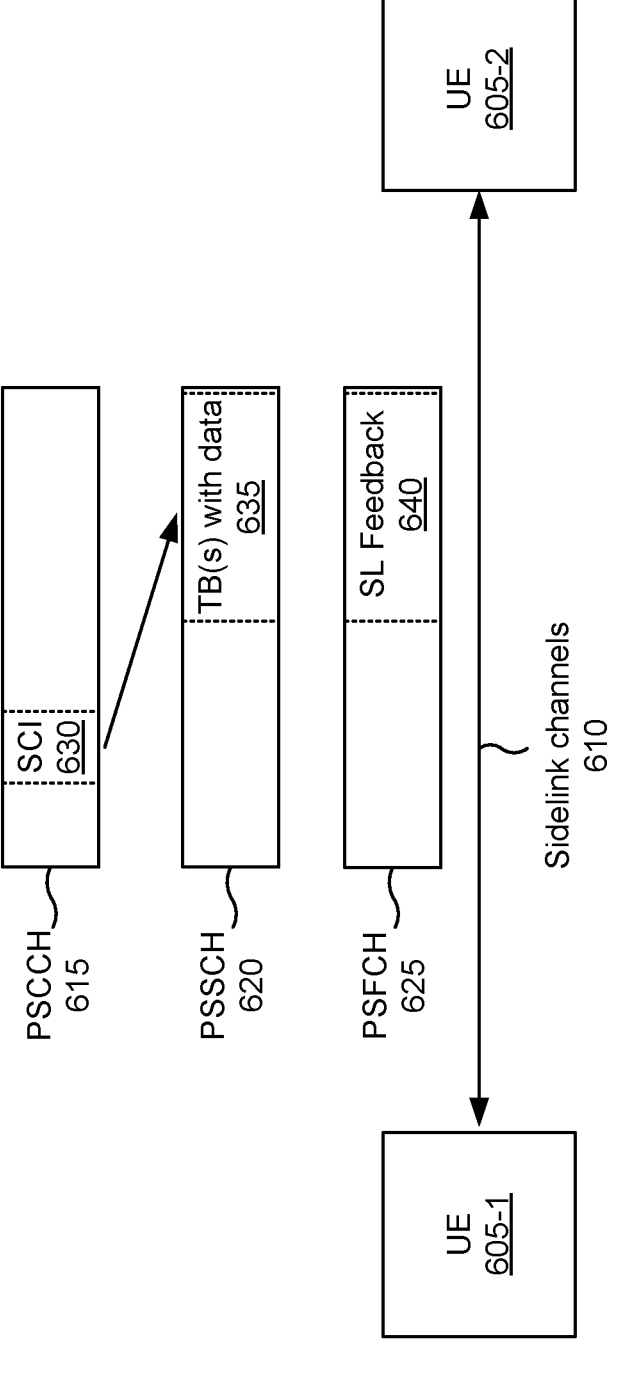
FIG. 6 is a diagram illustrating an example of sidelink communications, in accordance with the present disclosure.

FIG. 6 is a diagram illustrating an example 600 of sidelink communications, in accordance with the present disclosure. As shown in FIG. 6, a first UE 605-1 may communicate with a second UE 605-2 (and one or more other UEs 605) via one or more sidelink channels 610. The UEs 605-1 and 605-2 may communicate using the one or more sidelink channels 610 for peer-to-peer (P2P) communications, device-to-device (D2D) communications, vehicle-to-anything (V2X) communications (e.g., which may include vehicle-to-vehicle (V2V) communications, vehicle-to-infrastructure (V2I) communications, and/or vehicle-to-pedestrian (V2P) communications) and/or mesh networking. In some aspects, the UEs 605 (e.g., UE 605-1 and/or UE 605-2) may correspond to one or more other UEs described elsewhere herein, such as UE 120. In some aspects, the one or more sidelink channels 610 may use a PC5 interface and/or may operate in a high frequency band (e.g., the 5.9 GHz band). Additionally, or alternatively, the UEs 605 may synchronize timing of transmission time intervals (TTIs) (e.g., frames, subframes, slots, or symbols) using global navigation satellite system (GNSS) timing.

As further shown in FIG. 6, the one or more sidelink channels 610 may include a physical sidelink control channel (PSCCH) 615, a physical sidelink shared channel (PSSCH) 620, and/or a physical sidelink feedback channel (PSFCH) 625. The PSCCH 615 may be used to communicate control information, similar to a physical downlink control channel (PDCCH) and/or a physical uplink control channel (PUCCH) used for cellular communications with a BS 110 via an access link or an access channel. The PSSCH 620 may be used to communicate data, similar to a physical downlink shared channel (PDSCH) and/or a physical uplink shared channel (PUSCH) used for cellular communications with a BS 110 via an access link or an access channel. For example, the PSCCH 615 may carry sidelink control information (SCI) 630, which may indicate various control information used for sidelink communications, such as one or more resources (e.g., time resources, frequency resources, and/or spatial resources) where a transport block (TB) 635 may be carried on the PSSCH 620. The TB 635 may include data. The PSFCH 625 may be used to communicate sidelink feedback 640, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 615, in some aspects, the SCI 630 may include multiple communications in different stages, such as a first stage SCI (SCI-1) and a second stage SCI (SCI-2). The SCI-1 may be transmitted on the PSCCH 615. The SCI-2 may be transmitted on the PSSCH 620. The SCI-1 may include, for example, an indication of one or more resources (e.g., time resources, frequency resources, and/or spatial resources) on the PSSCH 620, information for decoding sidelink communications on the PSSCH, a quality of service (QOS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 620, such as a hybrid automatic repeat request (HARQ) process ID, a new data indicator (NDI), a source identifier, a destination identifier, and/or a channel state information (CSI) report trigger.

In some aspects, the one or more sidelink channels 610 may use resource pools. For example, a scheduling assignment (e.g., included in SCI 630) may be transmitted in sub-channels using specific resource blocks (RBs) across time. In some aspects, data transmissions (e.g., on the PSSCH 620) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 605 may operate using a sidelink transmission mode (e.g., Mode 1) where resource selection and/or scheduling is performed by a BS 110 (e.g., a base station, a CU, or a DU). For example, the UE 605 may receive a grant (e.g., in downlink control information (DCI) or in a radio resource control (RRC) message, such as for configured grants) from the BS 110 (e.g., directly or via one or more network nodes) for sidelink channel access and/or scheduling. In some aspects, a UE 605 may operate using a transmission mode (e.g., Mode 2) where resource selection and/or scheduling is performed by the UE 605 (e.g., rather than a BS 110). In some aspects, the UE 605 may perform resource selection and/or scheduling by sensing channel availability for transmissions. For example, the UE 605 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 605 may perform resource selection and/or scheduling using SCI 630 received in the PSCCH 615, which may indicate occupied resources and/or channel parameters. Additionally, or alternatively, the UE 605 may perform resource selection and/or scheduling by determining a channel busy ratio (CBR) associated with various sidelink channels, which may be used for rate control (e.g., by indicating a maximum number of resource blocks that the UE 605 can use for a particular set of subframes).

In the transmission mode where resource selection and/or scheduling is performed by a UE 605, the UE 605 may generate sidelink grants, and may transmit the grants in SCI 630. A sidelink grant may indicate, for example, one or more parameters (e.g., transmission parameters) to be used for an upcoming sidelink transmission, such as one or more resource blocks to be used for the upcoming sidelink transmission on the PSSCH 620 (e.g., for TBs 635), one or more subframes to be used for the upcoming sidelink transmission, and/or a modulation and coding scheme (MCS) to be used for the upcoming sidelink transmission. In some aspects, a UE 605 may generate a sidelink grant that indicates one or more parameters for semi-persistent scheduling (SPS), such as a periodicity of a sidelink transmission. Additionally, or alternatively, the UE 605 may generate a sidelink grant for event-driven scheduling, such as for an on-demand sidelink message.

As indicated above, FIG. 6 is provided as an example. Other examples may differ from what is described with respect to FIG. 6.

Figure 7:
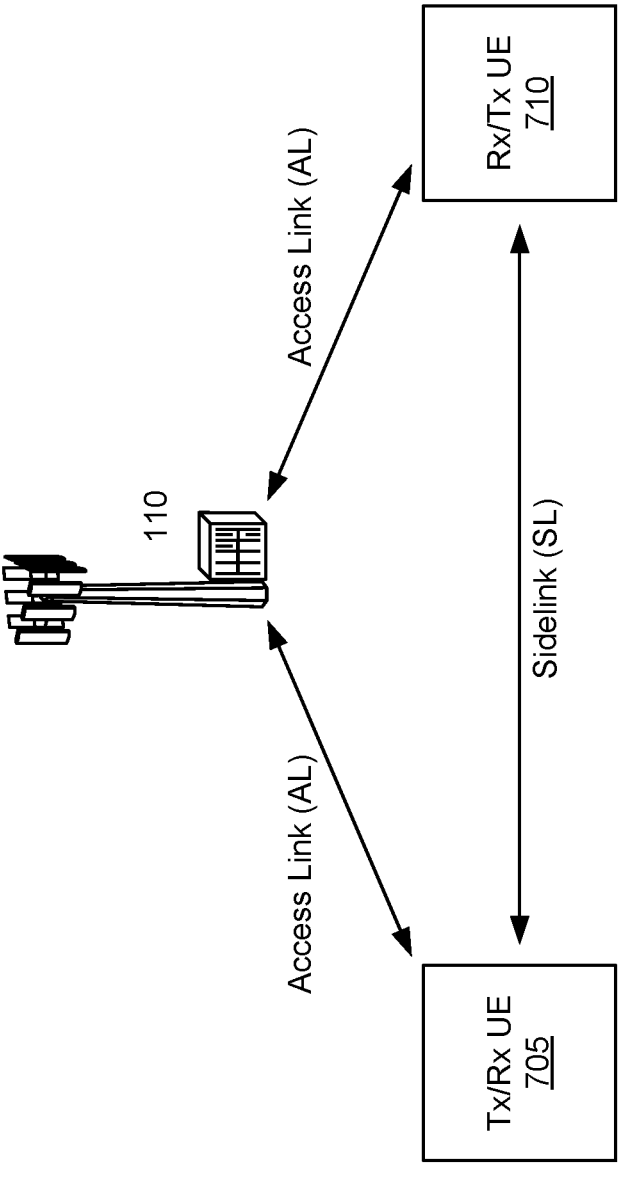
FIG. 7 is a diagram illustrating an example of sidelink communications and access link communications, in accordance with the present disclosure.

FIG. 7 is a diagram illustrating an example 700 of sidelink communications and access link communications, in accordance with the present disclosure.

As shown in FIG. 7, a transmitter (Tx)/receiver (Rx) UE 705 and an Rx/Tx UE 710 may communicate with one another via a sidelink, as described above in connection with FIG. 6. As further shown, in some sidelink modes, a BS 110 may communicate with the Tx/Rx UE 705 (e.g., directly or via one or more network nodes), such as via a first access link. Additionally, or alternatively, in some sidelink modes, the BS 110 may communicate with the Rx/Tx UE 710 (e.g., directly or via one or more network nodes), such as via a first access link. The Tx/Rx UE 705 and/or the Rx/Tx UE 710 may correspond to one or more UEs described elsewhere herein, such as the UE 120 of FIG. 1. Thus, a direct link between UEs 120 (e.g., via a PC5 interface) may be referred to as a sidelink, and a direct link between a BS 110 and a UE 120 (e.g., via a Uu interface) may be referred to as an access link. Sidelink communications may be transmitted via the sidelink, and access link communications may be transmitted via the access link. An access link communication may be either a downlink communication (from a BS 110 to a UE 120) or an uplink communication (from a UE 120 to a BS 110).

In some aspects, a UE (e.g., the UE 605-1, the UE 605-2, the UE 705, the UE 710) may communicate according to a set of configurations, as described above with regard to FIG. 5. Some configurations may relate to sidelink communication, and may be referred to as sidelink configurations. For example, a configuration may indicate whether Mode 1 resource allocation is enabled (e.g., for dynamic grants only, for configured grants only, or for both dynamic grants and configured grants). As another example, a configuration may indicate whether scheduling requests are enabled for the sidelink (in which case the UE may transmit the scheduling request to a network entity for the network entity to allocate resources). As another example, a configuration may indicate whether buffer status reports (BSR) and/or delay status reports (DSR) are enabled for the sidelink (in which case the UE may transmit the BSR or the DSR to a network entity for the network entity to allocate resources).

In some aspects, a configuration may indicate whether the UE is to receive or measure an SSB from a sidelink network entity such as a programmable logic controller (PLC) or another network entity. In some aspects, a configuration may indicate whether the UE is to transmit or receive HARQ-ACK feedback regarding sidelink communications. In some aspects, a configuration may indicate whether the UE is to transmit a CSI report to a sidelink network entity such as a PLC or another network entity. In some aspects, a configuration may indicate whether the UE is to receive or measure a sidelink reference transmission from a sidelink network entity such as a PLC or another network entity. In some aspects, a configuration may indicate whether a sidelink network entity such as a PLC or other network entity will process a sidelink reference signal transmitted by the UE. In some aspects, a configuration may indicate whether Mode 1 resource allocation is enabled for a sidelink network entity such as a PLC (e.g., for dynamic grants only, configured grants only, or both dynamic and configured grants). In some aspects, a configuration may indicate whether the UE is to support energy transfer from a sidelink network entity such as a PLC or a unit controlled by the PLC (e.g., a radio head). In some aspects, a configuration may indicate whether the UE is to support energy transfer scheduling by a sidelink network entity such as a PLC. In some aspects, a configuration may indicate whether the UE supports usage of an LP-WUR in the sidelink. In some aspects, a configuration may indicate whether the UE is to support one or more low-power signals (e.g., a synchronization signal, a preamble, an LP-WUS) in the sidelink, as received from or transmitted to a sidelink network entity such as a PLC.

As indicated above, FIG. 7 is provided as an example. Other examples may differ from what is described with respect to FIG. 7.

Figure 8:
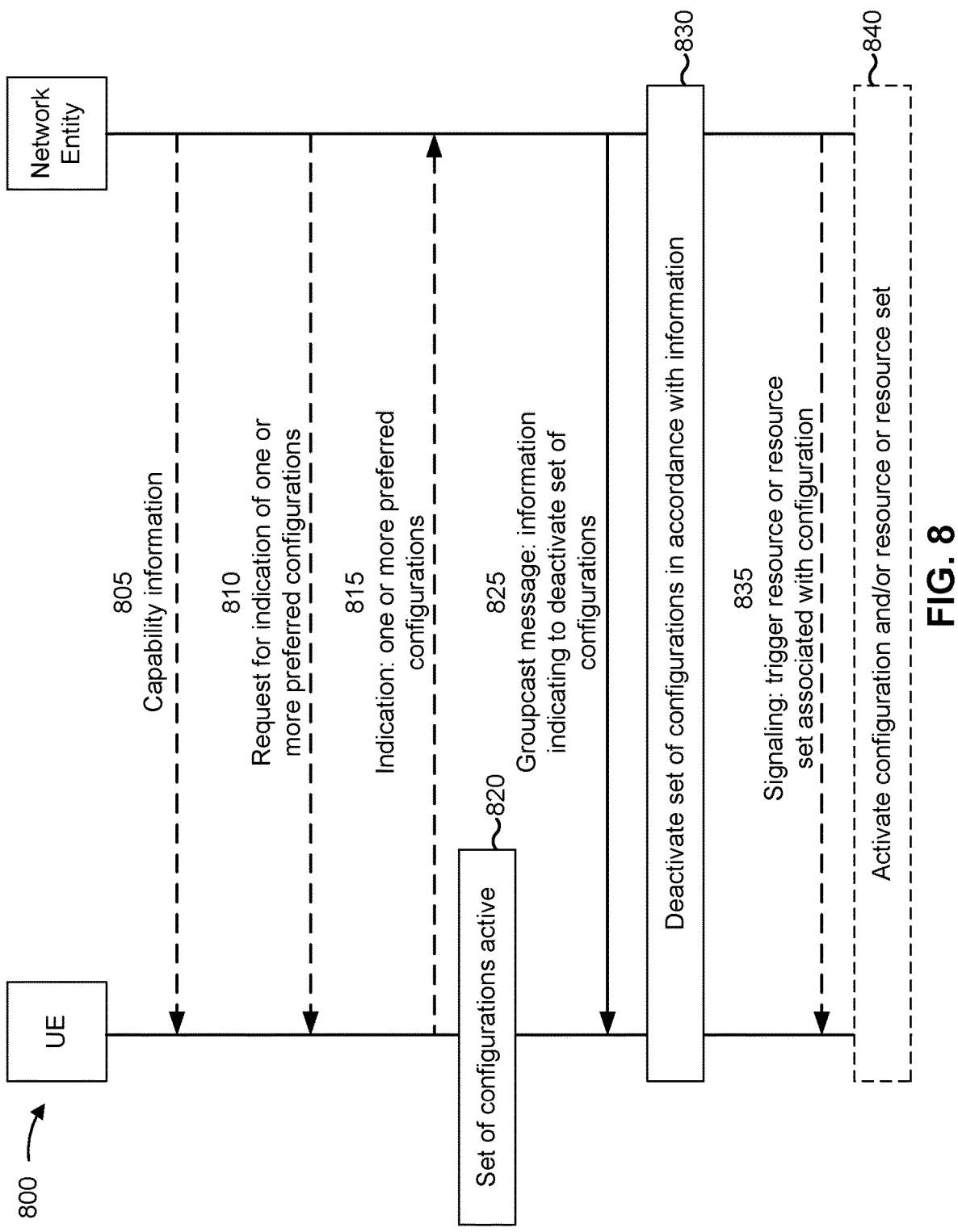
FIG. 8 is a diagram illustrating an example of signaling associated with groupcast feature deactivation, in accordance with the present disclosure.

FIG. 8 is a diagram illustrating an example 800 of signaling associated with groupcast feature deactivation, in accordance with the present disclosure. Example 800 includes a UE (e.g., UE 120, UE 605, UE 705, UE 710) and a network entity (e.g., BS 110 or one or more components of a disaggregated BS described in connection with FIG. 3).

As shown by reference number 805, in some aspects, the network entity may transmit, and the UE may receive, capability information. For example, the UE may receive the capability information during initial access. As another example, the UE may receive the capability information during capability exchange with the UE (e.g., during exchanging of capability information between the UE and the network entity). As another example, the UE may receive the capability information via Layer 1 signaling (e.g., DCI or a reference signal), Layer 2 signaling (e.g., MAC signaling), or Layer 3 signaling (e.g., RRC signaling). In some aspects, the capability information may indicate whether the network entity supports a configuration state, described in more detail elsewhere herein.

As shown by reference number 810, in some aspects, the network entity may transmit, and the UE may receive, a request for an indication of one or more preferred configurations. For example, the network entity may request a list of preferred resources for deactivation (e.g., cancelling, releasing, muting, freezing). In this example, as shown by reference number 815, the UE may transmit information indicating one or more preferred configurations for deactivation. The one or more preferred configurations for deactivation may be based at least in part on a relative importance of channels, signals, or operations at the UE. For example, the UE may include, in the list of preferred configurations for deactivation, one or more configurations that are expected to have a low impact on operation of the UE. For example, some CSI-RS configurations may be more beneficial for the UE than other CSI-RS configurations, or some configured grants may be more beneficial for the UE than other configured grants (such as according to a predicted uplink traffic parameter of the UE). The UE may transmit information indicating a less beneficial CSI-RS configuration or a less beneficial configured grant for deactivation.

In some aspects, the network entity may request a list of preferred configurations for activation (e.g., exclusion from a set of deactivated configurations). In this example, the UE may transmit information indicating one or more preferred configurations for activation or exclusion from a set of deactivated configurations. The one or more preferred configurations for activation may be based at least in part on a relative importance of channels, signals, or operations at the UE. For example, the UE may include, in the list of preferred configurations for activation, one or more configurations that are expected to have a high impact on operation of the UE (e.g., a more beneficial CSI-RS configuration or a more beneficial configured grant).

In some aspects, the network entity may identify one or more configurations to be excluded from a set of deactivated configurations. For example, the network entity may determine a list of excluded configurations. In some aspects, the network entity may determine the list of excluded configurations according to a set of preferred configurations for activation and/or a set of preferred configurations for deactivation. For example, the network entity may add a configuration to the list of excluded configurations if the configuration is a preferred configuration for activation. Additionally, or alternatively, the network entity may not add a configuration to the list of excluded configurations if the configuration is a preferred configuration for deactivation. The network entity may transmit, and the UE may receive, information (sometimes referred to as configuration information) indicating the one or more configurations to be excluded from the set of deactivated configurations. The preferred configurations may be referred to as "preferred" configurations since the network entity may, or may not, conform to the UE's indications of preferred configurations for activation or deactivation or exclusion.

As shown in FIG. 8, and by reference number 820, a set of configurations may be active at the UE. The set of configurations may include any one or more of the configurations described herein, such as one or more of the configurations described with regard to FIG. 5, one or more of the configurations described with regard to FIG. 7, one or more of the configurations described elsewhere in the description of FIG. 8, or a combination thereof. In some aspects, the network entity may configure a configuration of the set of configurations. For example, the network entity may transmit configuration information, to the UE, defining the configuration. In some aspects, a configuration of the set of configurations may define a resource or a resource set. For example, different resources or resource sets may be defined by different configurations, such that a given resource or resource set can be deactivated by deactivating the corresponding configuration.

For example, the set of configurations may include a configuration defining a signal transmission or reception. As another example, the set of configurations may include a reference signal measurement configuration (indicating to perform measurement or processing of one or more received reference signals, such as CSI-RS measurement, radio resource management (RRM) measurement, or radio link monitoring (RLM) measurement). As another example, the set of configurations may include a periodic CSI-RS measurement configuration (indicating to perform measurement or processing of periodic CSI-RSs). As yet another example, the set of configurations may include a triggered CSI-RS measurement configuration indicating to perform measurement or processing of a triggered (e.g., aperiodic) CSI-RS. As another example, the set of configurations may include a dynamic grant scheduling configuration indicating whether dynamic grant scheduling of PDSCHs and/or PUSCHs is permitted. As another example, the set of configurations may include a beam management configuration indicating whether to perform beam management (e.g., to operate one or more timers for beam management). As yet another example, the set of configurations may include a radio link failure configuration indicating whether to monitor for radio link failure (e.g., to operate one or more timers for radio link failure). As another example, the set of configurations may include a SIB1 reception configuration indicating whether to monitor for SIB1.

As shown by reference number 825, the network entity may transmit, and the UE may receive, a groupcast message. For example, the groupcast message may comprise a system information transmission (e.g., a SIB), an SSB, or a group common PDSCH transmission (e.g., a groupcast PDSCH transmission). As another example, the groupcast message may comprise a groupcast transmission, such as a Layer 1 groupcast transmission (e.g., group DCI), a Layer 2 groupcast transmission (e.g., MAC signaling), or a Layer 3 transmission (e.g., RRC information).

The groupcast message may include information (sometimes referred to as deactivation information) indicating to deactivate a set of configurations. For example, the groupcast message may indicate to deactivate the set of configurations until signaling reactivating the set of configurations is received. As another example, the groupcast message may indicate an expected duration of disabling a configuration. For example, the groupcast message may indicate a duration for which the set of configurations is to be deactivated. In this example, the UE may disable the set of configurations for the length of the duration. Additionally, or alternatively, the UE may enter a sleep state for the length of the duration (e.g., if the deactivated set of configurations allow the UE to enter the sleep state). Additionally, or alternatively, the UE may schedule uplink communications in accordance with the duration, such as according to traffic requirements of the UE.

In some aspects, the information may indicate a set identifier corresponding to the set of configurations. For example, the network entity may group configurations into sets of configurations, such as by transmitting configuration information indicating the sets of configurations. Each set of configurations may be associated with a set identifier, such that the network entity can collectively activate or deactivate all configurations of the set of configurations corresponding to the set of identifiers. Thus, the network entity can deactivate (e.g., release, freeze, disable), or reactivate, a set of configurations temporarily and/or temporally using Layer 1, Layer 2, or Layer 3 signaling.

For example, a first set of configurations (with a first set identifier) may include a list of CSI-RS resources or resource sets and SRS resources or resource sets. A second set of configurations (with a second set identifier) may include a list of CSI-RS resources or resource sets and dynamic PDSCH grants. A third set of configurations (with a third set identifier) may include a list of CSI-RS resources or resource sets and dynamic PUSCH grants. A fourth set of configurations (with a fourth set identifier) may include configurations for all types of uplink signals except one or more configurations for uplink signals indicated as excluded from the fourth set of configurations. A fifth set of configurations (with a fifth set identifier) may include configurations for all types of downlink signals except one or more configurations for downlink signals indicated as excluded from the fifth set of configurations. A sixth set of configurations (with a sixth set identifier) may include configurations for all types of CSI measurements except one or more configurations for CSI measurement indicated as excluded from the sixth set of configurations (e.g., RRM configurations, SSB configurations, TRS configurations, beam management configurations).

As shown by reference number 830, the UE and the network entity may deactivate the set of configurations in accordance with the information. In some aspects, the UE and/or the network entity may deactivate one or more timers used to implement the set of configurations. Additionally, or alternatively, the UE and/or the network entity may deactivate one or more measurements defined by the set of configurations.

In some aspects, the set of configurations includes a configuration defining a signal transmission or reception. In this example, deactivating the set of configurations may include deactivating the signal transmission or reception (at the UE and/or the network entity). As mentioned, the UE may enter a sleep state. For example, during the sleep state, the signal transmission or reception (e.g., in addition to one or more other functions of the UE) is deactivated.

In some aspects, the set of configurations includes a reference signal measurement configuration (e.g., CSI measurement, RRM, RLM, etc.). In this example, deactivating the set of configurations may include deactivating the reference signal measurement configuration. Since the reference signal measurement configuration is deactivated, the UE may skip one or more of a channel state information measurement, a radio resource management measurement, or a radio link monitoring measurement. The network entity may skip transmission of one or more reference signals corresponding to the reference signal measurement configuration.

In some aspects, the set of configurations includes a periodic CSI-RS measurement configuration. In this example, deactivating the set of configurations may include deactivating the periodic CSI-RS measurement configuration. The UE may deactivate reporting of periodic CSI according to the information. The network entity may skip transmission of CSI-RSs associated with (e.g., defined by) the periodic CSI-RS measurement configuration.

In some aspects, the set of configurations includes a triggered CSI-RS measurement configuration (such as an aperiodic CSI-RS measurement configuration or a semi-persistent CSI-RS measurement configuration). In this example, deactivating the set of configurations may include deactivating the triggered CSI-RS measurement configuration. In this example, the UE may refrain from monitoring downlink control information for a trigger associated with (e.g., indicating) the triggered CSI-RS measurement configuration in accordance with the triggered CSI-RS measurement configuration being deactivated. The network entity may refrain from transmitting the trigger.

In some aspects, the set of configurations includes a dynamic grant scheduling configuration. In this example, deactivating the set of configurations may include deactivating the dynamic grant scheduling configuration. In this example, the UE may refrain from monitoring a DCI format associated with the dynamic grant scheduling configuration. For example, the UE may cease monitoring a DCI format that can include dynamic grants (e.g., DCI Format 0_1 or 1_1) if dynamic grant PDSCH or PUSCH is disabled. The network entity may refrain from transmission using the DCI format.

In some aspects, the set of configurations includes a beam management configuration. The UE may deactivate the beam management configuration in accordance with the information. In this example, the UE may deactivate a radio link failure timer or a beam management timer associated with the beam management configuration.

In some aspects, the set of configurations includes a SIB1 reception configuration. In this example, deactivating the set of configurations may include deactivating the SIB1 reception configuration. In some aspects, the UE may transmit a request for SIB1 while the SIB1 reception configuration is deactivated. For example, the UE may request SIB1 if SIB1 is not transmitted without a request.

In some aspects, a configuration may be associated with a configuration state. A configuration state may indicate how long an associated configuration is to remain in a memory of the UE. For example, a configuration state may indicate how long a UE is to store a particular configuration until the particular configuration is erased (e.g., released) from a memory of the UE. In some aspects, a configuration state may indicate how long a particular configuration should be activated before transitioning to a deactivated state (e.g., a deactivated configuration state). A configuration may be associated with a configuration state if the behavior of the UE with regard to how long to store the particular configuration is governed by the configuration state. For example, the UE may determine a configuration state associated with a configuration. As another example, the UE may receive signaling indicating that the configuration is associated with the configuration state. Configuration states may enable the UE to maintain or erase configurations with decreased signaling from the network entity, thereby decreasing overhead.

In some aspects, a configuration state may be an active configuration state. In an active configuration state, the UE stores the set of configurations until signaling indicating to erase the set of configurations is received. For example, the set of configurations may be maintained in a memory, and/or activated for transmission or reception or processing, until the signaling is received. In some aspects, the active configuration state may be associated with a timer. For example, upon expiry of the timer, a configuration associated with the active configuration state may transition to an inactive configuration state or an idle configuration state (described below). In some aspects, the timer (e.g., an inactivity timer) may be different from an inactivity timer associated with an RRC inactive state.

In some aspects, a configuration state may be an inactive configuration state. In an inactive configuration state, a configuration is stored by the UE until expiry of a timer. Upon expiry of the timer, the configuration may be erased or released from the memory of the UE. Additionally, or alternatively, while in the inactive configuration state, the configuration may be deactivated. For example, the configuration may transition to an idle configuration state. In some aspects, the timer may be different from an idle timer associated with an RRC idle state. In the idle configuration state, the configuration is erased or released from a memory of the UE. For example, the configuration's activation or deactivation state may be erased, such that the configuration reverts to a default state. As another example, the configuration itself may be erased or released from the memory.

In some aspects, the set of configurations may be associated with the configuration state based at least in part on a device type of the UE. For example, the network entity may configure a configuration state only for an energy harvesting UE. As another example, the network entity may configure a configuration state only for an ambient IoT device. As another example, the network entity may configure a configuration state only for a UE that has indicated a capability relating to green networks, such as a capability for being configured with a network energy saving (NES) state cycle, a cell DRX cycle, or a cell DTX cycle, a capability for receiving an indication of a network entity's NES state, a capability for adapting to a network entity's NES state, or the like.

In some aspects, a configuration state may be associated with an NES state. An NES state may indicate a set of configurations or parameters at the network entity that relate to network energy savings. For example, a first NES state may indicate a full transmit power, a full decoding configuration, a full reference signaling configuration, or the like. A second NES state may indicate a decreased transmit power, a decreased (or deactivated) decoding configuration, a decreased (or deactivated) reference signaling configuration, or the like. For example, a first configuration state (e.g., an active configuration state) may be associated with (e.g., used while the network entity is in) the first NES state, and a second configuration state (e.g., an inactive configuration state or an idle configuration state) may be associated with (e.g., used while the network entity is in) the second NES state.

In some aspects, the UE may transmit information indicating one or more configurations and a corresponding configuration state. For example, the UE may transmit information indicating one or more first configurations associated with an active configuration state. Additionally, or alternatively, the UE may transmit information indicating one or more second configurations associated with an inactive configuration state. Additionally, or alternatively, the UE may transmit information indicating one or more third configurations associated with an idle configuration state. This information may be transmitted via Layer 1 signaling, Layer 2 signaling, Layer 3 signaling, or UE assistance information. Thus, the UE may suggest configurations for the active configuration state, the idle configuration state, and/or the inactive configuration state. In some aspects, the UE may transmit information indicating a timer length (such as the timer for the inactive configuration state, the idle configuration state, or the active configuration state). For example, the timer length may be based at least in part on a charging rate profile (e.g., a UE with a higher charging rate may suggest a longer timer), a discharging rate profile (e.g., a UE with a higher discharging rate may suggest a shorter timer), an energy level profile (e.g., a UE with a higher energy level of stored energy may suggest a longer timer), or a combination thereof.

As shown by reference number 835, in some aspects, the network entity may transmit signaling (e.g., Layer 1, Layer, or Layer 3 signaling) triggering a resource or a resource set associated with a configuration. "Triggering a resource or resource set" may include triggering transmission of a signal or channel on the resource or resource set, or triggering reception or measurement of a signal or channel on the resource or resource set. The resource or resource set may be associated with the configuration in that the resource or resource set is defined by the configuration, or in that the resource or resource set is linked to the configuration. As shown by reference number 840, the UE may enable the configuration, or the resource or resource set, in accordance with the signaling. In some aspects, the UE may enable the configuration associated with the resource or resource set upon receiving the trigger for the resource or the resource set. For example, if CSI-RS measurement (e.g., processing) is disabled, then enabling a CSI-RS resource, resource set, or report configuration may enable CSI-RS processing. As another example, if SRS measurement or beam management is disabled, then enabling an SRS or beam management resource or resource set may enable SRS measurement or beam management. In some other aspects, the UE may enable the resource or resource set upon receiving the trigger for the resource or the resource set. In some aspects, the UE may enable the triggered resource or resource set (and not the corresponding configuration). For example, the UE may enable reception or measurement of CSI-RS on a triggered resource or resource set without enabling CSI-RS processing. In some aspects, the UE may enable a part of the corresponding configuration relating to the triggered resource or resource set. For example, the UE may enable CSI-RS processing only for the triggered resource or resource set.

In some aspects, the network entity may trigger a set identifier (e.g., may trigger all configurations of a set of configurations associated with the set identifier). For example, the network entity may trigger transmission, reception, measurement, or processing of all resources or resource sets associated with a set identifier. In this example, all configurations of the set of configurations may be activated.

As indicated above, FIG. 8 is provided as an example. Other examples may differ from what is described with regard to FIG. 8.

Figure 9:
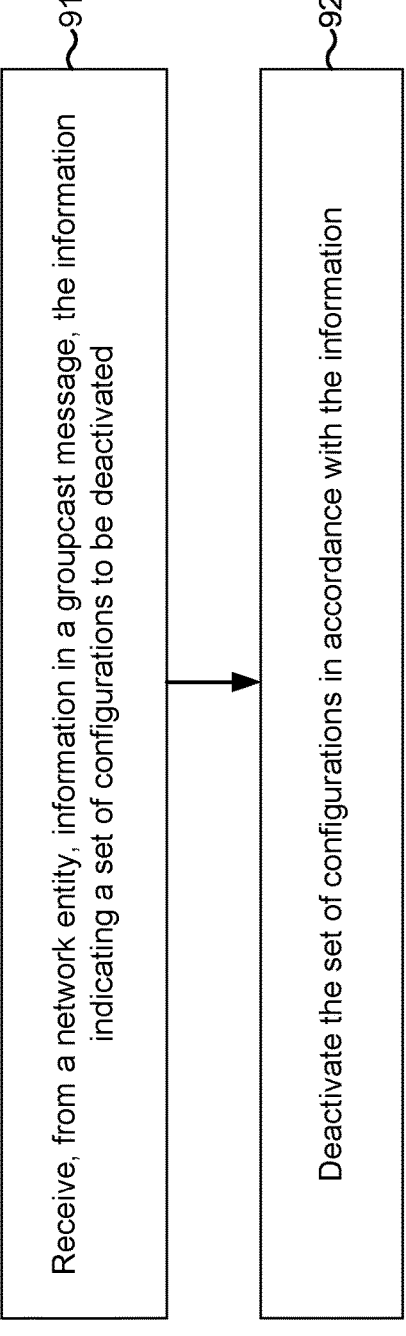
FIG. 9 is a flowchart of an example method of wireless communication.

FIG. 9 is a flowchart of an example method 900 of wireless communication. The method 900 may be performed by, for example, a UE (e.g., UE 120).

Method 900 begins at 910 with receiving, from a network entity, information in a groupcast message, the information indicating a set of configurations to be deactivated. For example, the UE may receive, from a network entity, information in a groupcast message indicating a set of configurations to be deactivated, as described above in connection with, for example, FIG. 8 and at reference number 825.

Method 900 then proceeds at 920 with deactivating the set of configurations in accordance with the information. For example, the UE may deactivate the set of configurations in accordance with the information, as described above in connection with, for example, FIG. 8 and at reference number 830.

In some aspects, the groupcast message comprises at least one of a system information transmission or a group common physical downlink shared channel transmission.

In some aspects, the set of configurations includes a configuration defining a signal transmission or reception, wherein deactivating the set of configurations further comprises deactivating the signal transmission or reception, and wherein the method 900 further comprises entering a sleep state during which the signal transmission or reception is deactivated.

In some aspects, the set of configurations includes a reference signal measurement configuration, wherein deactivating the set of configurations further comprises deactivating the reference signal measurement configuration, and wherein the method 900 further comprises skipping one or more of a channel state information measurement, a radio resource management measurement, or a radio link monitoring measurement after deactivating the set of configurations.

In some aspects, the set of configurations includes a periodic CSI-RS measurement configuration, wherein deactivating the set of configurations further comprises deactivating the periodic CSI-RS measurement configuration, and wherein the method 900 further comprises deactivating reporting of periodic channel state information according to the information.

In some aspects, the set of configurations includes a triggered CSI-RS measurement configuration, wherein deactivating the set of configurations further comprises deactivating the triggered CSI-RS measurement configuration, and wherein the method 900 further comprises refraining from monitoring downlink control information for a trigger associated with the triggered CSI-RS measurement configuration.

In some aspects, the set of configurations includes a dynamic grant scheduling configuration, wherein deactivating the set of configurations further comprises deactivating the dynamic grant scheduling configuration, and wherein the method 900 further comprises refraining from monitoring a downlink control information format associated with the dynamic grant scheduling configuration.

In some aspects, the set of configurations includes a beam management configuration, wherein deactivating the set of configurations further comprises deactivating the beam management configuration, and wherein the method 900 further comprises deactivating a radio link failure timer or a beam management timer associated with the beam management configuration.

In some aspects, the set of configurations includes a SIB1 reception configuration, wherein deactivating the set of configurations further comprises deactivating the SIB1 reception configuration, and wherein the method 900 further comprises transmitting a request for SIB1 while the SIB1 reception configuration is deactivated.

In some aspects, the information indicates a duration for which the set of configurations is to be deactivated, and deactivating the set of configurations in accordance with the information further comprises deactivating the set of configurations for the duration.

In some aspects, the information indicates a set identifier corresponding to the set of configurations.

In some aspects, the information is deactivation information, wherein the method further comprises receiving configuration information indicating one or more configurations excluded from the set of configurations, wherein the deactivation information indicates to deactivate all configurations, of a plurality of configurations, except the one or more configurations.

In some aspects, method 900 includes receiving a request for an indication of one or more preferred configurations, and transmitting the indication in accordance with the request.

In some aspects, the one or more preferred configurations are one or more preferred configurations for deactivation.

In some aspects, the one or more preferred configurations are one or more preferred configurations for activation.

In some aspects, the one or more preferred configurations are one or more preferred configurations for exclusion from the set of configurations.

In some aspects, the set of configurations are associated with a configuration state.

In some aspects, the configuration state is an active configuration state in which the set of configurations are stored by the UE until signaling indicating to erase the set of configurations is received.

In some aspects, the configuration state is an inactive configuration state in which the set of configurations are stored by the UE until expiry of a timer, wherein the information indicates that the set of configurations are associated with the inactive configuration state.

In some aspects, the configuration state is a first configuration state and wherein the method 900 further comprises erasing a configuration of the set of configurations, in accordance with an idle configuration state, upon expiry of a timer associated with the set of configurations.

In some aspects, the set of configurations are associated with the configuration state based at least in part on the UE having a capability for green networks or a device type associated with energy harvesting.

In some aspects, method 900 includes receiving capability information indicating that the network entity supports the configuration state.

In some aspects, method 900 includes transmitting signaling indicating at least one of one or more first configurations associated with an active configuration state, one or more second configurations associated with an inactive configuration state, one or more third configurations associated with an idle configuration state, or a length of a timer associated with one or more configuration states.

In some aspects, the length of the timer is based at least in part on at least one of a charging rate profile of the UE, a discharging rate profile of the UE, or an energy level profile of the UE.

In some aspects, method 900 includes receiving signaling that triggers a resource associated with a configuration of the set of configurations, and enabling the configuration in accordance with the signaling.

In some aspects, method 900 includes receiving signaling that triggers a resource associated with a configuration of the set of configurations, and enabling the resource in accordance with the signaling.

In some aspects, the network entity is a sidelink network entity and the set of configurations includes one or more sidelink configurations.

In some aspects, the set of configurations includes at least one of a resource or a resource set.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Although FIG. 9 shows example blocks of method 900, in some aspects, method 900 may include additional blocks, fewer blocks, different blocks, or differently arranged blocks than those depicted in FIG. 9. Additionally, or alternatively, two or more of the blocks of method 900 may be performed in parallel.

Figure 10:
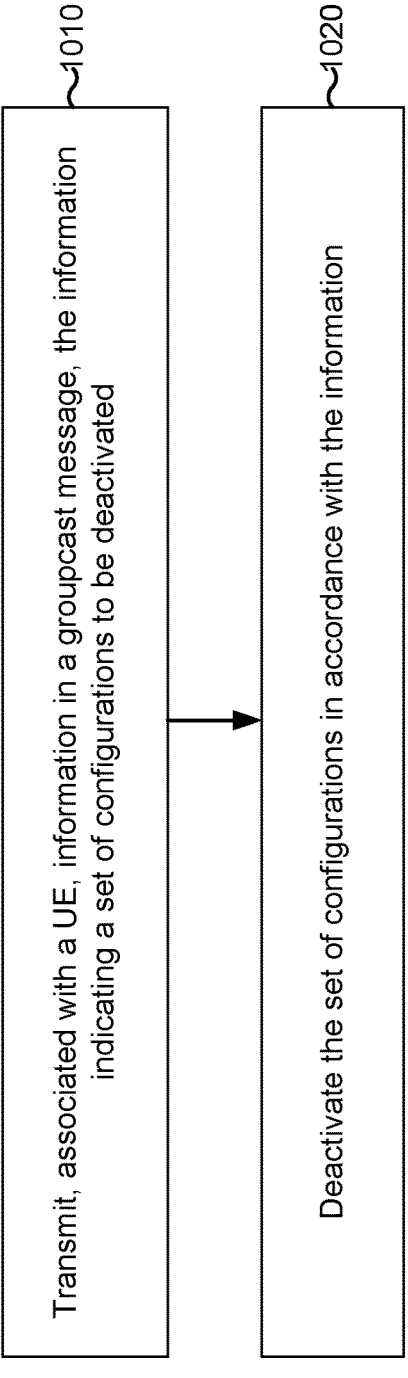
FIG. 10 is a flowchart of an example method of wireless communication.

FIG. 10 is a flowchart of an example method 1000 of wireless communication. The method 1000 may be performed by, for example, a network entity (e.g., the BS 110 or one or more components of a disaggregated base station described with regard to FIG. 3).

Method 1000 begins at 1010 with transmitting, associated with a UE, information in a groupcast message indicating a set of configurations to be deactivated. For example, the network entity may transmit, associated with a UE, information in a groupcast message, the information indicating a set of configurations to be deactivated, as described above in connection with, for example, FIG. 8 and at reference number 825. The transmission may be associated with the UE in that the groupcast message is directed to a group including the UE, or is a broadcast message covering an area in which the UE is included.

Method 1000 then proceeds at 1020 with deactivating the set of configurations in accordance with the information. For example, the network entity may deactivate the set of configurations in accordance with the information, as described above in connection with, for example, FIG. 8 and at reference number 830.

In some aspects, the groupcast message comprises at least one of a system information transmission or a group common physical downlink shared channel transmission.

In some aspects, the set of configurations includes a configuration defining a signal transmission or reception, wherein deactivating the set of configurations further comprises deactivating the signal transmission or reception.

In some aspects, the set of configurations includes a reference signal measurement configuration, wherein deactivating the set of configurations further comprises deactivating the reference signal measurement configuration.

In some aspects, the set of configurations includes a periodic CSI-RS configuration, wherein deactivating the set of configurations further comprises deactivating the periodic CSI-RS configuration.

In some aspects, the set of configurations includes a triggered CSI-RS measurement configuration, wherein deactivating the set of configurations further comprises deactivating the triggered CSI-RS measurement configuration.

In some aspects, the set of configurations includes a dynamic grant scheduling configuration, wherein deactivating the set of configurations further comprises deactivating the dynamic grant scheduling configuration.

In some aspects, the set of configurations includes a SIB1 transmission configuration, wherein deactivating the set of configurations further comprises deactivating the SIB1 transmission configuration.

In some aspects, the information indicates a duration for which the set of configurations is to be deactivated, and deactivating the set of configurations in accordance with the information further comprises deactivating the set of configurations for the duration.

In some aspects, the information indicates a set identifier corresponding to the set of configurations.

In some aspects, the information is deactivation information, wherein the method further comprises transmitting configuration information indicating one or more configurations excluded from the set of configurations, wherein the deactivation information indicates to deactivate all configurations, of a plurality of configurations, except the one or more configurations.

In some aspects, method 1000 includes transmitting a request for an indication of one or more preferred configurations, and receiving the indication in accordance with the request.

In some aspects, the one or more preferred configurations are one or more preferred configurations for deactivation.

In some aspects, the one or more preferred configurations are one or more preferred configurations for activation.

In some aspects, the one or more preferred configurations are one or more preferred configurations for exclusion from the set of configurations.

In some aspects, the set of configurations are associated with a configuration state.

In some aspects, the configuration state is an active configuration state in which the set of configurations are stored until signaling indicating to erase the set of configurations is received.

In some aspects, the configuration state is an inactive configuration state in which the set of configurations are stored until expiry of a timer, wherein the information indicates that the set of configurations are associated with the inactive configuration state.

In some aspects, the set of configurations are associated with the configuration state based at least in part on the UE having a capability for green networks or a device type associated with energy harvesting.

In some aspects, method 1000 includes transmitting capability information indicating that the network entity supports the configuration state.

In some aspects, the configuration state is associated with a network energy saving state of the network entity.

In some aspects, method 1000 includes receiving signaling indicating at least one of one or more first configurations associated with an active configuration state, one or more second configurations associated with an inactive configuration state, one or more third configurations associated with an idle configuration state, or a length of a timer associated with one or more configuration states, wherein transmitting the information further comprises transmitting the information based at least in part on the signaling. For example, the information may be based at least in part on the signaling in that the information indicates to deactivate configurations associated with an active configuration state, or in that the information omits one or more configurations associated with an inactive configuration state or an idle configuration state (since these one or more configurations may be erased by the UE according to a timer).

In some aspects, the length of the timer is based at least in part on at least one of a charging rate profile of the UE, a discharging rate profile of the UE, or an energy level profile of the UE.

In some aspects, method 1000 includes transmitting signaling that triggers a resource associated with a configuration of the set of configurations, and enabling the configuration.

In some aspects, method 1000 includes transmitting signaling that triggers a resource associated with a configuration of the set of configurations, and enabling the resource.

In some aspects, the network entity is a sidelink network entity and the set of configurations includes one or more sidelink configurations.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Although FIG. 10 shows example blocks of method 1000, in some aspects, method 1000 may include additional blocks, fewer blocks, different blocks, or differently arranged blocks than those depicted in FIG. 10. Additionally, or alternatively, two or more of the blocks of method 1000 may be performed in parallel.

FIG. 11 is a diagram illustrating an example of an implementation of code and circuitry for a communications device 1100, in accordance with the present disclosure. The communications device 1100 may be a UE, or a UE may include the communications device 1100.

The communications device 1100 includes a processing system 1102 coupled to a transceiver 1108 (e.g., a transmit-ter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes one or more processors 1120. In various aspects, the one or more processors 1120 may be representative of one or more of receive processor 258, transmit processor 264, TX MIMO processor 266, and/or controller/processor 280, as described with respect to FIG. 2. The one or more processors 1120 are coupled to a computer-readable medium/memory 1130 via a bus 1106. In various aspects, the computer-readable medium/memory 1130 may be representative of memory 282, as described with respect to FIG. 2. In certain aspects, the computer-readable medium/memory 1130 is configured to store instructions (e.g., computer-executable code, processor-executable code) that when executed by the one or more processors 1120, cause the one or more processors 1120 to perform the method 900 described with respect to FIG. 9, or any aspect related to it. Note that reference to a processor performing a function of communications device 1100 may include one or more processors performing that function of communications device 1100.

As shown in FIG. 11, the communications device 1100 may include circuitry for receiving, from a network entity, information in a groupcast message, the information indicating a set of configurations to be deactivated (circuitry 1135).

As shown in FIG. 11, the communications device 1100 may include, stored in computer-readable medium/memory 1130, code for receiving, from a network entity, information in a groupcast message, the information indicating a set of configurations to be deactivated (code 1140).

As shown in FIG. 11, the communications device 1100 may include circuitry for deactivating the set of configurations in accordance with the information (circuitry 1145).

As shown in FIG. 11, the communications device 1100 may include, stored in computer-readable medium/memory 1130, code for deactivating the set of configurations in accordance with the information (code 1150).

Various components of the communications device 1100 may provide means for performing the method 900 described with respect to FIG. 9, or any aspect related to it. For example, means for transmitting, sending, or outputting for transmission may include the transceiver(s) 254 and/or antenna(s) 252 of the UE 120 and/or transceiver 1108 and antenna 1110 of the communications device 1100 in FIG. 11. Means for receiving or obtaining may include the transceiver(s) 254 and/or antenna(s) 252 of the UE 120 and/or transceiver 1108 and antenna 1110 of the communications device 1100 in FIG. 11.

FIG. 11 is provided as an example. Other examples may differ from what is described in connection with FIG. 11.

FIG. 12 is a diagram illustrating an example of an implementation of code and circuitry for a communications device 1200, in accordance with the present disclosure. The communications device 1200 may be a network entity (such as BS 110 or a disaggregated base station as described with regard to FIG. 3), or a network entity may include the communications device 1200.

The communications device 1200 includes a processing system 1202 coupled to a transceiver 1208 (e.g., a transmit-ter and/or a receiver). The transceiver 1208 is configured to transmit and receive signals for the communications device 1200 via an antenna 1210, such as the various signals as described herein. The network interface 1212 is configured to obtain and send signals for the communications device 1200 via communications link(s), such as a backhaul link, midhaul link, and/or fronthaul link as described herein, such as with respect to FIG. 3. The processing system 1202 may be configured to perform processing functions for the communications device 1200, including processing signals received and/or to be transmitted by the communications device 1200.

The processing system 1202 includes one or more processors 1220. In various aspects, the one or more processors 1220 may be representative of one or more of receive processor 238, transmit processor 220, TX MIMO processor 230, and/or controller/processor 240, as described with respect to FIG. 2. The one or more processors 1220 are coupled to a computer-readable medium/memory 1230 via a bus 1206. In various aspects, the computer-readable medium/memory 1230 may be representative of memory 242, as described with respect to FIG. 2. In certain aspects, the computer-readable medium/memory 1230 is configured to store instructions (e.g., computer-executable code, processor-executable code) that when executed by the one or more processors 1220, cause the one or more processors 1220 to perform the method 1000 described with respect to FIG. 10, or any aspect related to it. Note that reference to a processor performing a function of communications device 1200 may include one or more processors performing that function of communications device 1200.

As shown in FIG. 12, the communications device 1200 may include circuitry for transmitting, associated with a UE, information in a groupcast message, the information indicating a set of configurations to be deactivated (circuitry 1235).

As shown in FIG. 12, the communications device 1200 may include, stored in computer-readable medium/memory 1230, code for transmitting, associated with a UE, information in a groupcast message, the information indicating a set of configurations to be deactivated (code 1240).

As shown in FIG. 12, the communications device 1200 may include circuitry for deactivating the set of configurations in accordance with the information (circuitry 1245).

As shown in FIG. 12, the communications device 1200 may include, stored in computer-readable medium/memory 1230, code for deactivating the set of configurations in accordance with the information (code 1250).

Various components of the communications device 1200 may provide means for performing the method 1000 described with respect to FIG. 10, or any aspect related to it. For example, means for transmitting, sending, or outputting for transmission may include the transceiver(s) 232 and/or antenna(s) 234 of the BS 110 and/or transceiver 1208 and antenna 1210 of the communications device 1200 in FIG. 12. Means for receiving or obtaining may include the transceiver(s) 232 and/or antenna(s) 234 of the BS 110 and/or transceiver 1208 and antenna 1210 of the communications device 1200 in FIG. 12.

FIG. 12 is provided as an example. Other examples may differ from what is described in connection with FIG. 12.

The following provides an overview of some Aspects of the present disclosure:

Aspect 1: A method of wireless communication performed by a user equipment (UE), comprising: receiving, from a network entity, information in a groupcast message, the information indicating a set of configurations to be deactivated; and deactivating the set of configurations in accordance with the information.

Aspect 2: The method of Aspect 1, wherein the groupcast message comprises at least one of a system information transmission or a group common physical downlink shared channel transmission.

Aspect 3: The method of any of Aspects 1-2, wherein the set of configurations includes a configuration defining a signal transmission or reception, wherein deactivating the set of configurations further comprises deactivating the signal transmission or reception, and wherein the method further comprises entering a sleep state during which the signal transmission or reception is deactivated.

Aspect 4: The method of any of Aspects 1-3, wherein the set of configurations includes a reference signal measurement configuration, wherein deactivating the set of configurations further comprises deactivating the reference signal measurement configuration, and wherein the method further comprises skipping one or more of a channel state information measurement, a radio resource management measurement, or a radio link monitoring measurement after deactivating the set of configurations.

Aspect 5: The method of any of Aspects 1-4, wherein the set of configurations includes a periodic channel state information reference signal (CSI-RS) measurement configuration, wherein deactivating the set of configurations further comprises deactivating the periodic CSI-RS measurement configuration, and wherein the method further comprises refraining from reporting periodic channel state information after deactivating the periodic CSI-RS measurement configuration.

Aspect 6: The method of any of Aspects 1-5, wherein the set of configurations includes a triggered channel state information reference signal (CSI-RS) measurement configuration, wherein deactivating the set of configurations further comprises deactivating the triggered CSI-RS measurement configuration, and wherein the method further comprises refraining from monitoring downlink control information for a trigger associated with the triggered CSI-RS measurement configuration after deactivating the triggered CSI-RS measurement configuration.

Aspect 7: The method of any of Aspects 1-6, wherein the set of configurations includes a dynamic grant scheduling configuration, wherein deactivating the set of configurations further comprises deactivating the dynamic grant scheduling configuration, and wherein the method further comprises refraining from monitoring a downlink control information format associated with the dynamic grant scheduling configuration after deactivating the dynamic grant scheduling configuration.

Aspect 8: The method of any of Aspects 1-7, wherein the set of configurations includes a beam management configuration, wherein deactivating the set of configurations further comprises deactivating the beam management configuration, and wherein the method further comprises deactivating a radio link failure timer or a beam management timer associated with the beam management configuration in connection with deactivating the beam management configuration.

Aspect 9: The method of any of Aspects 1-8, wherein the set of configurations includes a system information block 1 (SIB1) reception configuration, wherein deactivating the set of configurations further comprises deactivating the SIB1 reception configuration, and wherein the method further comprises transmitting a request for SIB1 when the SIB1 reception configuration is deactivated.

Aspect 10: The method of any of Aspects 1-9, wherein the information indicates a duration for which the set of configurations is to be deactivated, and wherein deactivating the set of configurations in accordance with the information further comprises deactivating the set of configurations for the duration.

Aspect 11: The method of any of Aspects 1-10, wherein the information indicates a set identifier corresponding to the set of configurations.

Aspect 12: The method of any of Aspects 1-11, wherein the information is deactivation information, wherein the method further comprises receiving configuration information indicating one or more configurations excluded from the set of configurations, wherein the deactivation information indicates to deactivate all configurations, of a plurality of configurations, except the one or more configurations.

Aspect 13: The method of any of Aspects 1-12, further comprising: receiving a request for an indication of one or more preferred configurations; and transmitting the indication in accordance with the request.

Aspect 14: The method of Aspect 13, wherein the one or more preferred configurations are one or more preferred configurations for deactivation, one or more preferred configurations for activation, or one or more preferred configurations for exclusion from the set of configurations.

Aspect 15: The method of any of Aspects 1-14, wherein the set of configurations are associated with a configuration state.

Aspect 16: The method of Aspect 15, wherein the configuration state is an active configuration state according to which the set of configurations are stored by the UE until signaling indicating to erase the set of configurations is received.

Aspect 17: The method of Aspect 15, wherein the configuration state is an inactive configuration state according to which the set of configurations are stored by the UE until expiry of a timer, wherein the information indicates that the set of configurations are associated with the inactive configuration state.

Aspect 18: The method of Aspect 15, wherein the configuration state is a first configuration state and wherein the method further comprises erasing a configuration of the set of configurations, in accordance with an idle configuration state, upon expiry of a timer associated with the set of configurations.

Aspect 19: The method of Aspect 15, wherein the set of configurations are associated with the configuration state based at least in part on the UE having a capability for green networks or a device type associated with energy harvesting.

Aspect 20: The method of Aspect 15, further comprising receiving capability information indicating that the network entity supports the configuration state.

Aspect 21: The method of Aspect 15, further comprising transmitting signaling indicating at least one of: one or more first configurations associated with an active configuration state, one or more second configurations associated with an inactive configuration state, one or more third configurations associated with an idle configuration state, or a length of a timer associated with one or more configuration states.

Aspect 22: The method of Aspect 21, wherein the length of the timer is based at least in part on at least one of a charging rate profile of the UE, a discharging rate profile of the UE, or an energy level profile of the UE.

Aspect 23: The method of any of Aspects 1-22, further comprising receiving signaling that triggers a resource associated with a configuration of the set of configurations; and enabling the configuration in accordance with the signaling.

Aspect 24: The method of any of Aspects 1-23, further comprising receiving signaling that triggers a resource associated with a configuration of the set of configurations; and enabling the resource in accordance with the signaling.

Aspect 25: The method of any of Aspects 1-24, wherein the network entity is a sidelink network entity and the set of configurations includes one or more sidelink configurations.

Aspect 26: The method of any of Aspects 1-25, wherein the set of configurations includes at least one of a resource or a resource set.

Aspect 27: A method of wireless communication performed by a network entity, comprising: transmitting, associated with a user equipment (UE), information in a groupcast message, the information indicating a set of configurations to be deactivated; and deactivating the set of configurations in accordance with the information.

Aspect 28: The method of Aspect 27, wherein the groupcast message comprises at least one of a system information transmission or a group common physical downlink shared channel transmission.

Aspect 29: The method of any of Aspects 27-28, wherein the set of configurations includes a configuration defining a signal transmission or reception, wherein deactivating the set of configurations further comprises deactivating the signal transmission or reception.

Aspect 30: The method of any of Aspects 27-29, wherein the set of configurations includes a reference signal measurement configuration, wherein deactivating the set of configurations further comprises deactivating the reference signal measurement configuration.

Aspect 31: The method of any of Aspects 27-30, wherein the set of configurations includes a periodic channel state information reference signal (CSI-RS) configuration, wherein deactivating the set of configurations further comprises deactivating the periodic CSI-RS configuration.

Aspect 32: The method of any of Aspects 27-31, wherein the set of configurations includes a triggered channel state information reference signal (CSI-RS) measurement configuration, wherein deactivating the set of configurations further comprises deactivating the triggered CSI-RS measurement configuration.

Aspect 33: The method of any of Aspects 27-32, wherein the set of configurations includes a dynamic grant scheduling configuration, wherein deactivating the set of configurations further comprises deactivating the dynamic grant scheduling configuration.

Aspect 34: The method of any of Aspects 27-33, wherein the set of configurations includes a system information block 1 (SIB1) transmission configuration, wherein deactivating the set of configurations further comprises deactivating the SIB1 transmission configuration.

Aspect 35: The method of any of Aspects 27-34, wherein the information indicates a duration for which the set of configurations is to be deactivated, and wherein deactivating the set of configurations in accordance with the information further comprises deactivating the set of configurations for the duration.

Aspect 36: The method of any of Aspects 27-35, wherein the information indicates a set identifier corresponding to the set of configurations.

Aspect 37: The method of any of Aspects 27-36, wherein the information is deactivation information, wherein the method further comprises transmitting configuration information indicating one or more configurations excluded from the set of configurations, wherein the deactivation information indicates to deactivate all configurations, of a plurality of configurations, except the one or more configurations.

Aspect 38: The method of any of Aspects 27-37, further comprising: transmitting a request for an indication of one or more preferred configurations; and receiving the indication in accordance with the request.

Aspect 39: The method of Aspect 38, wherein the one or more preferred configurations are one or more preferred configurations for deactivation, one or more preferred configurations for activation, or one or more preferred configurations for exclusion from the set of configurations.

Aspect 40: The method of any of Aspects 27-39, wherein the set of configurations are associated with a configuration state.

Aspect 41: The method of Aspect 40, wherein the configuration state is an active configuration state according to which the set of configurations are stored until signaling indicating to erase the set of configurations is received.

Aspect 42: The method of Aspect 40, wherein the configuration state is an inactive configuration state according to which the set of configurations are stored until expiry of a timer, wherein the information indicates that the set of configurations are associated with the inactive configuration state.

Aspect 43: The method of Aspect 40, wherein the set of configurations are associated with the configuration state based at least in part on the UE having a capability for green networks or a device type associated with energy harvesting.

Aspect 44: The method of Aspect 40, further comprising transmitting capability information indicating that the network entity supports the configuration state.

Aspect 45: The method of Aspect 40, wherein the configuration state is associated with a network energy saving state of the network entity.

Aspect 46: The method of Aspect 40, further comprising receiving signaling indicating at least one of: one or more first configurations associated with an active configuration state, one or more second configurations associated with an inactive configuration state, one or more third configurations associated with an idle configuration state, or a length of a timer associated with one or more configuration states, wherein transmitting the information further comprises transmitting the information based at least in part on the signaling.

Aspect 47: The method of Aspect 46, wherein the length of the timer is based at least in part on at least one of a charging rate profile of the UE, a discharging rate profile of the UE, or an energy level profile of the UE.

Aspect 48: The method of any of Aspects 27-47, further comprising transmitting signaling that triggers a resource associated with a configuration of the set of configurations; and enabling the configuration.

Aspect 49: The method of any of Aspects 27-48, further comprising transmitting signaling that triggers a resource associated with a configuration of the set of configurations; and enabling the resource.

Aspect 50: The method of any of Aspects 27-49, wherein the network entity is a sidelink network entity and the set of configurations includes one or more sidelink configurations.

Aspect 51: An apparatus for wireless communication at a device, comprising a processor; memory coupled with the processor; and instructions stored in the memory and executable by the processor to cause the apparatus to perform the method of one or more of Aspects 1-50.

Aspect 52: A device for wireless communication, comprising a memory and one or more processors coupled to the memory, the one or more processors configured to perform the method of one or more of Aspects 1-50.

Aspect 53: An apparatus for wireless communication, comprising at least one means for performing the method of one or more of Aspects 1-50.

Aspect 54: A non-transitory computer-readable medium storing code for wireless communication, the code comprising instructions executable by a processor to perform the method of one or more of Aspects 1-50.

Aspect 55: A non-transitory computer-readable medium storing a set of instructions for wireless communication, the set of instructions comprising one or more instructions that, when executed by one or more processors of a device, cause the device to perform the method of one or more of Aspects 1-50.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Reference to "a/the processor," "a/the controller/processor," or the like (in the singular) should be understood to refer to any one or more of the processors described in connection with FIG. 2 (such as a single processor or a combination of multiple different processors). Reference to "one or more processors" should be understood to refer to any one or more of the processors described in connection with FIG. 2. For example, a first set of (one or more) processors of the one or more processors may perform a first function described as being performed by the one or more processors, and a second set of (one or more) processors of the one or more processors may perform a second function described as being performed by the one or more processors, where the first set of processors and the second set of processors may be the same set of processors or different sets of processors. Similarly, reference to "a/the memory" should be understood to refer to any one or more memories of the corresponding device or node (such as a single memory or a combination of multiple different memories). Reference to "one or more memories" should be understood to refer to any one or more memories of a corresponding device, such as the memory described in connection with FIG. 2. For example, a first memory of the one or more memories may perform a first function described as being performed by the one or more memories, and a second memory of the one or more memories may perform a second function described as being performed by the one or more memories.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising one or more memories coupled to one or more processors, wherein the one or more processors are configured to cause the UE to:
    receive, from a network entity, information in a groupcast message, the information indicating a set of configurations to be deactivated; and
    deactivate the set of configurations in accordance with the information, wherein the set of configurations are associated with a configuration state, and wherein:

the configuration state is an active configuration state according to which the set of configurations are configured to be stored by the UE until signaling indicating to erase the set of configurations is received; or the configuration state is an inactive configuration state according to which the set of configurations are configured to be stored by the UE until expiry of a timer, wherein the information indicates that the set of configurations are associated with the inactive configuration state; or the configuration state is a first configuration state and wherein the one or more processors are further configured to cause the UE to erase a configuration of the set of configurations, in accordance with an idle configuration state, upon expiry of a timer associated with the first configuration state; or the set of configurations are associated with the configuration state based at least in part on the UE having a capability for green networks or a device type associated with energy harvesting; or the one or more processors are further configured to cause the UE to receive capability information indicating that the network entity supports the configuration state.

2. The UE of claim 1, wherein the groupcast message comprises at least one of a system information transmission or a group common physical downlink shared channel transmission.

3. The UE of claim 1, wherein the configuration state is the active configuration state according to which the set of configurations are configured to be stored by the UE until signaling indicating to erase the set of configurations is received.

4. The UE of claim 1, wherein the configuration state is the inactive configuration state according to which the set of configurations are configured to be stored by the UE until expiry of the timer, wherein the information indicates that the set of configurations are associated with the inactive configuration state.

5. The UE of claim 1, wherein the configuration state is the first configuration state and wherein the one or more processors are further configured to cause the UE to erase the configuration of the set of configurations, in accordance with the idle configuration state, upon expiry of the timer associated with the first configuration state.

6. The UE of claim 1, wherein the set of configurations are associated with the configuration state based at least in part on the UE having the capability for green networks or the device type associated with energy harvesting.

7. The UE of claim 1, wherein the one or more processors are further configured to cause the UE to receive capability information indicating that the network entity supports the configuration state.

8. A network entity for wireless communication, comprising one or more memories coupled to one or more processors, wherein the one or more processors are configured to cause the network entity to:

transmit, associated with a user equipment (UE), information in a groupcast message, the information indicating a set of configurations to be deactivated; and deactivate the set of configurations in accordance with the information, wherein the set of configurations are associated with a configuration state, and wherein:

the configuration state is an active configuration state according to which the set of configurations are configured to be stored by the UE until signaling indicating to erase the set of configurations is received; or the configuration state is an inactive configuration state according to which the set of configurations are configured to be stored by the UE until expiry of a timer, wherein the information indicates that the set of configurations are associated with the inactive configuration state; or the set of configurations are associated with the configuration state based at least in part on the UE having a capability for green networks or a device type associated with energy harvesting; or wherein the one or more processors are further configured to cause the network entity to transmit capability information indicating that the network entity supports the configuration state.

9. A method of wireless communication performed by a user equipment (UE), comprising:

receiving, from a network entity, information in a groupcast message, the information indicating a set of configurations to be deactivated; and deactivating the set of configurations in accordance with the information, wherein the set of configurations are associated with a configuration state, and wherein:

the configuration state is an active configuration state according to which the set of configurations are configured to be stored by the UE until signaling indicating to erase the set of configurations is received; or the configuration state is an inactive configuration state according to which the set of configurations are configured to be stored by the UE until expiry of a timer, wherein the information indicates that the set of configurations are associated with the inactive configuration state; or the configuration state is a first configuration state and wherein the method further comprises erasing a configuration of the set of configurations, in accordance with an idle configuration state, upon expiry of a timer associated with the first configuration state; or the set of configurations are associated with the configuration state based at least in part on the UE having a capability for green networks or a device type associated with energy harvesting; or the method further comprises receiving capability information indicating that the network entity supports the configuration state.

10. The method of claim 9, wherein the groupcast message comprises at least one of a system information transmission or a group common physical downlink shared channel transmission.

11. The method of claim 9, wherein the configuration state is the active configuration state according to which the set of configurations are configured to be stored by the UE until signaling indicating to erase the set of configurations is received.

12. The method of claim 9, wherein the configuration state is the inactive configuration state according to which the set of configurations are configured to be stored by the UE until expiry of the timer, wherein the information indicates that the set of configurations are associated with the inactive configuration state.

13. The method of claim 9, wherein the configuration state is the first configuration state and wherein the method further comprises erasing the configuration of the set of configurations, in accordance with the idle configuration state, upon expiry of the timer associated with the first configuration state.

14. The method of claim 9, wherein the set of configurations are associated with the configuration state based at least in part on the UE having the capability for green networks or the device type associated with energy harvesting.

15. The method of claim 9, wherein the method further comprises receiving capability information indicating that the network entity supports the configuration state.

16. A method of wireless communication performed by a network entity, comprising:

transmitting, associated with a user equipment (UE), information in a groupcast message, the information indicating a set of configurations to be deactivated; and deactivating the set of configurations in accordance with the information, wherein the set of configurations are associated with a configuration state, and wherein:

the configuration state is an active configuration state according to which the set of configurations are configured to be stored by the UE until signaling indicating to erase the set of configurations is received; or the configuration state is an inactive configuration state according to which the set of configurations are configured to be stored by the UE until expiry of a timer, wherein the information indicates that the set of configurations are associated with the inactive configuration state; or the set of configurations are associated with the configuration state based at least in part on the UE having a capability for green networks or a device type associated with energy harvesting; or the method further comprises transmitting capability information indicating that the network entity supports the configuration state.

17. The method of claim 16, wherein the configuration state is the active configuration state according to which the set of configurations are configured to be stored by the UE until signaling indicating to erase the set of configurations is received.

18. The method of claim 16, wherein the configuration state is the inactive configuration state according to which the set of configurations are configured to be stored by the UE until expiry of the timer, wherein the information indicates that the set of configurations are associated with the inactive configuration state.

19. The method of claim 16, wherein the set of configurations are associated with the configuration state based at least in part on the UE having the capability for green networks or the device type associated with energy harvesting.

20. The method of claim 16, wherein the method further comprises transmitting capability information indicating that the network entity supports the configuration state.

21. The network entity of claim 8, wherein the groupcast message comprises at least one of a system information transmission or a group common physical downlink shared channel transmission.

22. The network entity of claim 8, wherein the configuration state is the active configuration state according to which the set of configurations are configured to be stored by the UE until signaling indicating to erase the set of configurations is received.

23. The network entity of claim 16, wherein the configuration state is the inactive configuration state according to which the set of configurations are configured to be stored by the UE until expiry of the timer, wherein the information indicates that the set of configurations are associated with the inactive configuration state.

24. The network entity of claim 8, wherein the set of configurations are associated with the configuration state based at least in part on the UE having the capability for green networks or the device type associated with energy harvesting.

25. The network entity of claim 8, wherein the one or more processors are further configured to cause the network entity to transmit capability information indicating that the network entity supports the configuration state.

26. The method of claim 16, wherein the groupcast message comprises at least one of a system information transmission or a group common physical downlink shared channel transmission.

* * * * *